US009589575B1

(12) United States Patent
Ayrapetian et al.

(10) Patent No.: US 9,589,575 B1
(45) Date of Patent: Mar. 7, 2017

(54) ASYNCHRONOUS CLOCK FREQUENCY DOMAIN ACOUSTIC ECHO CANCELLER

(71) Applicant: Amazon Technologies, Inc., Seattle, WA (US)

(72) Inventors: Robert Ayrapetian, Morgan Hill, CA (US); Philip Ryan Hilmes, San Jose, CA (US)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 0 days.

(21) Appl. No.: 14/956,992

(22) Filed: Dec. 2, 2015

(51) Int. Cl.
*G10L 21/0232* (2013.01)
*H04R 3/02* (2006.01)
*G06F 17/14* (2006.01)
*G10L 21/0208* (2013.01)

(52) U.S. Cl.
CPC ........ *G10L 21/0232* (2013.01); *G06F 17/142* (2013.01); *H04R 3/02* (2013.01); *G10L 2021/02082* (2013.01)

(58) Field of Classification Search
CPC ............. G10L 21/0232; G10L 21/0208; G06F 17/142; H04M 9/082; H04R 3/02; H04B 3/232
USPC ...................................... 381/66, 93, 94.1, 83
See application file for complete search history.

(56) References Cited

U.S. PATENT DOCUMENTS 4,682,358 A * 7/1987 Werner .................. H04B 3/232 370/291
4,896,318 A * 1/1990 Kokubo ................. H04B 3/238 370/289
6,549,587 B1 * 4/2003 Li ............................ H04B 3/23 375/324
7,120,259 B1 * 10/2006 Ballantyne ............. H04B 3/493 381/71.11
8,259,928 B2 * 9/2012 He ......................... H04M 9/082 379/406.09
8,320,554 B1 * 11/2012 Chu ...................... H04M 9/082 379/406.08
9,219,456 B1 * 12/2015 Ayrapetian ............ H04M 9/082
9,373,318 B1 * 6/2016 Piersol ................. G10K 11/175
9,472,203 B1 * 10/2016 Ayrapetian .......... G10L 21/0208
2009/0185695 A1 * 7/2009 Marton ................. H04M 9/082 381/66
2013/0044873 A1 * 2/2013 Etter ..................... H04M 9/082 379/406.12
2015/0117656 A1 * 4/2015 Abe ....................... H04B 3/232 381/66

* cited by examiner

*Primary Examiner* — David Ton
(74) *Attorney, Agent, or Firm* — Seyfarth Shaw LLP; Ilan Barzilay

(57) ABSTRACT

An echo cancellation system that detects and compensates for differences in sample rates between the echo cancellation system and a set of wireless speakers based on a frequency-domain analysis. The system generates Fourier transforms for a microphone signal and a reference signal and determines a series of angles for individual frames. For each tone in the Fourier transforms, the system determines the angles and uses linear regression to determine an individual frequency offset associated with the tone. Using the individual frequency offsets associated with the tones, the system uses linear regression to determine an overall frequency offset between the audio sent to the speakers and the audio received from a microphone. Based on the overall frequency offset, samples of the audio are added or dropped when echo cancellation is performed, compensating for the frequency offset.

20 Claims, 14 Drawing Sheets

ASYNCHRONOUS CLOCK FREQUENCY DOMAIN ACOUSTIC ECHO CANCELLER

BACKGROUND

In audio systems, automatic echo cancellation (AEC) refers to techniques that are used to recognize when a system has recaptured sound via a microphone after some delay that the system previously output via a speaker. Systems that provide AEC subtract a delayed version of the original audio signal from the captured audio, producing a version of the captured audio that ideally eliminates the "echo" of the original audio signal, leaving only new audio information. For example, if someone were singing karaoke into a microphone while prerecorded music is output by a loudspeaker, AEC can be used to remove any of the recorded music from the audio captured by the microphone, allowing the singer's voice to be amplified and output without also reproducing a delayed "echo" the original music. As another example, a media player that accepts voice commands via a microphone can use AEC to remove reproduced sounds corresponding to output media that are captured by the microphone, making it easier to process input voice commands.

BRIEF DESCRIPTION OF DRAWINGS

For a more complete understanding of the present disclosure, reference is now made to the following description taken in conjunction with the accompanying drawings.

DETAILED DESCRIPTION

Figure 1A:
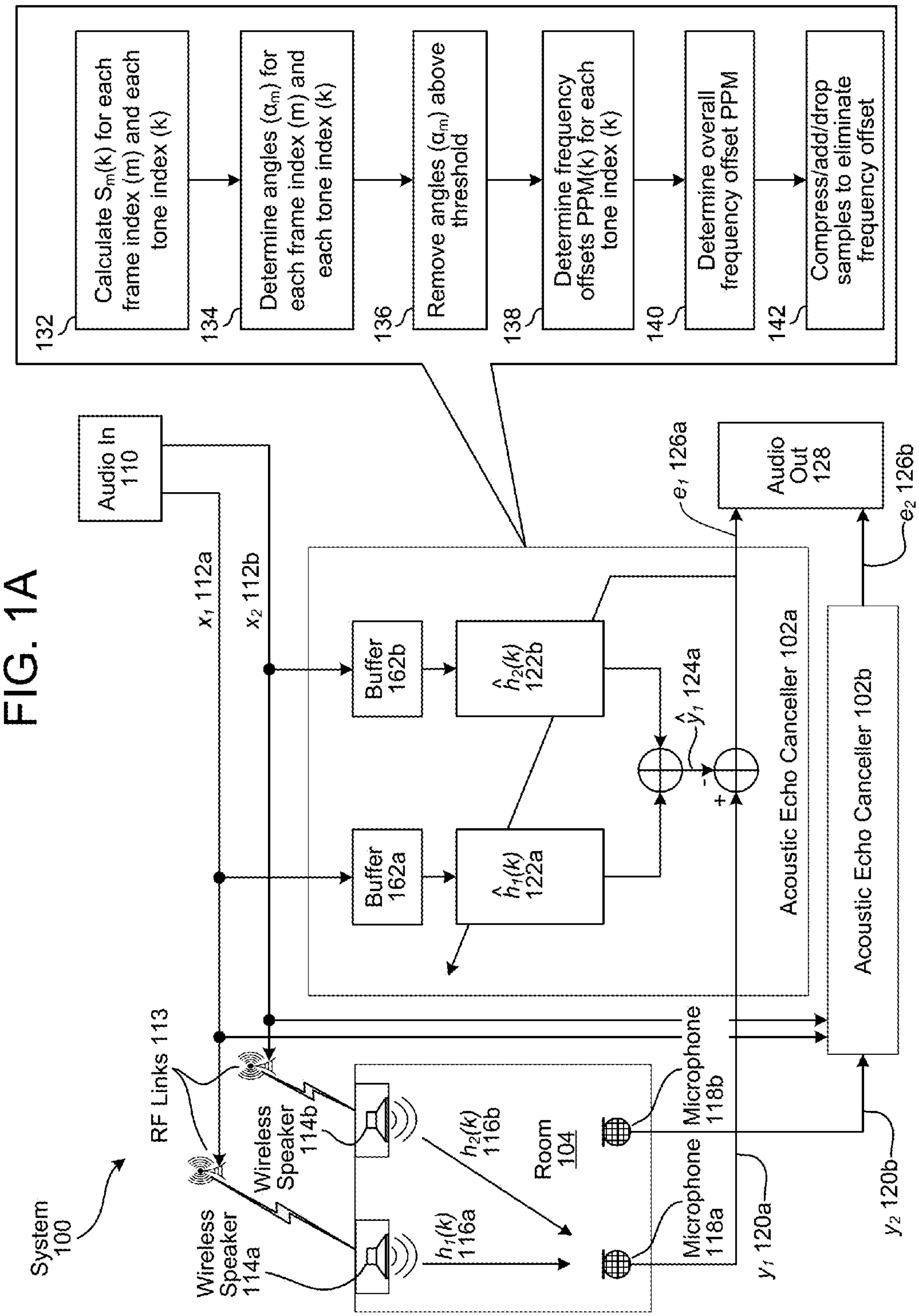
FIGS. 1A to 1B illustrate an echo cancellation system that compensates for frequency offsets caused by differences in sampling rates according to embodiments of the present disclosure.

Many electronic devices operate based on a timing "clock" signal produced by a crystal oscillator. For example, when a computer is described as operating at 2 GHz, the 2 GHz refers to the frequency of the computer's clock. This clock signal can be thought of as the basis for an electronic device's "perception" of time. Specifically, a synchronous electronic device may time its own operations based on cycles of its own clock. If there is a difference between otherwise identical devices' clocks, these differences can result in some devices operating faster or slower than others.

In stereo and multi-channel audio systems that include wireless or network-connected loudspeakers and/or microphones, a major cause of problems for conventional AEC is when there is a difference in clock synchronization between loudspeakers and microphones. For example, in a wireless "surround sound" 5.1 system comprising six wireless loudspeakers that each receive an audio signal from a surround-sound receiver, the receiver and each loudspeaker has its own crystal oscillator which provides the respective component with an independent "clock" signal.

Among other things that the clock signals are used for is converting analog audio signals into digital audio signals ("A/D conversion") and converting digital audio signals into analog audio signals ("D/A conversion"). Such conversions are commonplace in audio systems, such as when a surround-sound receiver performs A/D conversion prior to transmitting audio to a wireless loudspeaker, and when the loudspeaker performs D/A conversion on the received signal to recreate an analog signal. The loudspeaker produces audible sound by driving a "voice coil" with an amplified version of the analog signal.

An implicit premise in using an acoustic echo canceller (AEC) is that the clock for A/D conversion for a microphone and the clock for D/A conversion are generated from the same oscillator (there is no frequency offset between A/D conversion and D/A conversion). In modern complex devices (PCs, smartphones, smart TVs, etc.), this condition cannot be satisfied, because of the use of multiple audio devices, external devices connected by USB or wireless, and so on. The difference in sampling rate between the clocks degrades the AEC performance. That means that a standard AEC cannot be used if the clock of A/D and D/A are not made from the same crystal.

A problem for an AEC system occurs when the audio that the surround-sound receiver transmits to a speaker is output at a subtly different "sampling" rate by the loudspeaker. When the AEC system attempts to remove the audio output by the loudspeaker from audio captured by the system's microphone(s) by subtracting a delayed version of the originally transmitted audio, the playback rate of the audio captured by the microphone is subtly different than the audio that had been sent to the loudspeaker.

For example, consider loudspeakers built for use in a surround-sound system that transfers audio data using a 48 kHz sampling rate (i.e., 48,000 digital samples per second of analog audio signal). An actual rate based on a first component's clock signal might actually be 48,000.001 samples per second, whereas another component might operate at an actual rate of 48,000.002 samples per second. This difference of 0.001 samples per second between actual frequencies is referred to as a frequency "offset." The consequences of a frequency offset is an accumulated "drift" in the timing between the components over time. Uncorrected, after one-thousand seconds, the accumulated drift is an entire sample of difference between components.

In practice, each loudspeaker in a multi-channel audio system may have a different frequency offset to the surround sound receiver, and the loudspeakers may have different frequency offsets relative to each other. If the microphone(s) are also wireless or network-connected to the AEC system (e.g., a microphone on a wireless headset), they may also contribute to the accumulated drift between the captured reproduced audio signal(s) and the captured audio signals(s).

FIG. 1A illustrates a high-level conceptual block diagram of echo-cancellation aspects of a multi-channel AEC system 100 in "time" domain. As illustrated, an audio input 110 provides stereo audio "reference" signals $x_1(n)$ 112*a* and $x_2(n)$ 112*b*. The reference signal $x_1(n)$ 112*a* is transmitted via a radio frequency (RF) link 113 to a wireless loudspeaker 114*a*, and the reference signal $x_2(n)$ 112*b* is transmitted via an RF link 113 to a wireless loudspeaker 114*b*. Each speaker outputs the received audio, and portions of the output sounds are captured by a pair of microphone 118*a* and 118*b*. As will be described further below, each AEC 102 performs echo-cancellation in the frequency domain, but the system 100 is illustrated in FIG. 1A in time domain to provide context. The improved method of using frequency-domain AEC algorithm is based on a STFT (short-time Fourier transform) time-domain to frequency-domain conversion to estimate frequency offset, and the method of using the measured frequency offset to correct it. While FIG. 1 illustrates the frequency offset being determined by the AEC system 100, this is intended for illustrative purposes only and the disclosure is not limited thereto. Instead, the frequency offset may be determined and corrected independent of the echo cancellation by the AEC system 100 or other devices.

The portion of the sounds output by each of the loudspeakers that reaches each of the microphones 118*a*/118*b* can be characterized based on transfer functions. FIG. 1 illustrates transfer functions $h_1(n)$ 116*a* and $h_2(n)$ 116*b* between the loudspeakers 114*a* and 114*b* (respectively) and the microphone 118*a*. The transfer functions vary with the relative positions of the components and the acoustics of the room 104. If the position of all of the objects in a room 104 are static, the transfer functions are likewise static. Conversely, if the position of an object in the room 104 changes, the transfer functions may change.

The transfer functions (e.g., 116*a*, 116*b*) characterize the acoustic "impulse response" of the room 104 relative to the individual components. The impulse response, or impulse response function, of the room 104 characterizes the signal from a microphone when presented with a brief input signal (e.g., an audible noise), called an impulse. The impulse response describes the reaction of the system as a function of time. If the impulse response between each of the loudspeakers 116*a*/116*b* is known, and the content of the reference signals $x_1(n)$ 112*a* and $x_2(n)$ 112*b* output by the loudspeakers is known, then the transfer functions 116*a* and 116*b* can be used to estimate the actual loudspeaker-reproduced sounds that will be received by a microphone (in this case, microphone 118*a*). The microphone 118*a* converts the captured sounds into a signal $y_1(n)$ 120*a*. A second set of transfer functions is associated with the other microphone 118*b*, which converts captured sounds into a signal $y_2(n)$ 120*b*.

The "echo" signal $y_1(n)$ 120*a* contains some of the reproduced sounds from the reference signals $x_1(n)$ 112*a* and $x_2(n)$ 112*b*, in addition to any additional sounds picked up in the room 104. The echo signal $y_1(n)$ 120*a* can be expressed as:

$$y_1(n)=h_1(n)*x_1(n)+h_2(n)*x_2(n) \qquad [1]$$

where $h_1(n)$ 116*a* and $h_2(n)$ 116*b* are the loudspeaker-to-microphone impulse responses in the receiving room 104, $x_1(n)$ 112*a* and $x_2(n)$ 112*b* are the loudspeaker reference signals, * denotes a mathematical convolution, and "n" is an audio sample.

The acoustic echo canceller 102*a* calculates estimated transfer functions $\hat{h}_1$ (n) 122*a* and $\hat{h}_2$ (n) 122*b*. These estimated transfer functions produce an estimated echo signal $\hat{y}_1(n)$ 124*a* corresponding to an estimate of the echo component in the echo signal $y_1(n)$ 120*a*. The estimated echo signal can be expressed as:

$$\hat{y}_1(n)=\hat{h}_1(k)*x_1(n)+\hat{h}_2(n)*x_2(n) \qquad [2]$$

where * again denotes convolution. Subtracting the estimated echo signal 124*a* from the echo signal 120*a* produces the error signal $e_1(n)$ 126*a*, which together with the error signal $e_2(n)$ 126*b* for the other channel, serves as the output (i.e., audio output 128). Specifically:

$$\hat{e}_1(n)=y_1(n)-\hat{y}_1(n) \qquad [3]$$

The acoustic echo canceller 102*a* calculates frequency domain versions of the estimated transfer functions $\hat{h}_1(n)$ 122*a* and $\hat{h}_2(n)$ 122*b* using short term adaptive filter coefficients W(k,r). In conventional AEC systems operating in time domain, the adaptive filter coefficients are derived using least mean squares (LMS) or stochastic gradient algorithms, which use an instantaneous estimate of a gradient to update an adaptive weight vector at each time step. With this notation, the LMS algorithm can be iteratively expressed in the usual form:

$$h_{new}=h_{old}+\mu*e*x \qquad [4]$$

where $h_{new}$ is an updated transfer function, $h_{old}$ is a transfer function from a prior iteration, μ is the step size between samples, e is an error signal, and x is a reference signal.

Applying such adaptation over time (i.e., over a series of samples), it follows that the error signal "e" should eventually converge to zero for a suitable choice of the step size μ (assuming that the sounds captured by the microphone 118*a* correspond to sound entirely based on the references signals 112*a* and 112*b* rather than additional ambient noises, such that the estimated echo signal $\hat{y}_1(n)$ 124*a* cancels out the echo signal $y_1(n)$ 120*a*). However, e→0 does not always imply that $h-\hat{h}\to 0$, where the estimated transfer function $\hat{h}$ cancelling the corresponding actual transfer function h is the goal of the adaptive filter. For example, the estimated transfer functions $\hat{h}$ may cancel a particular string of samples, but is unable to cancel all signals, e.g., if the string of samples has no energy at one or more frequencies. As a result, effective cancellation may be intermittent or transitory. Having the estimated transfer function $\hat{h}$ approximate the actual transfer function h is the goal of single-channel echo cancellation, and becomes even more critical in the case of multichannel echo cancellers that require estimation of multiple transfer functions.

While drift accumulates over time, the need for multiple estimated transfer functions $\hat{h}$ in multichannel echo cancellers accelerates the mismatch between the echo signal y from a microphone and the estimated echo signal $\hat{y}$ from the echo canceller. To mitigate and eliminate drift, it is therefore necessary to estimate the frequency offset for each channel, so that each estimated transfer function $\hat{h}$ can compensate for difference in component clocks.

The relative frequency offset can be defined in terms of "ppm" (parts-per-million) error between components. The normalized sampling clock frequency offset (error) is defined as:

$$\text{PPM error}=Ftx/Frx-1 \qquad [5]$$

For example, if a loudspeaker (transmitter) sampling frequency Ftx is 48,000 Hz and a microphone (receiver) sampling frequency Frx is 48,001 Hz, then the frequency offset between Ftx and Frx is −20.833 ppm. During 1 second, the transmitter and receiver are creating 48,000 and 48,001 samples respectively. Hence, there will be 1 additional sample created at the receiver side during every second.

Figure 1B:
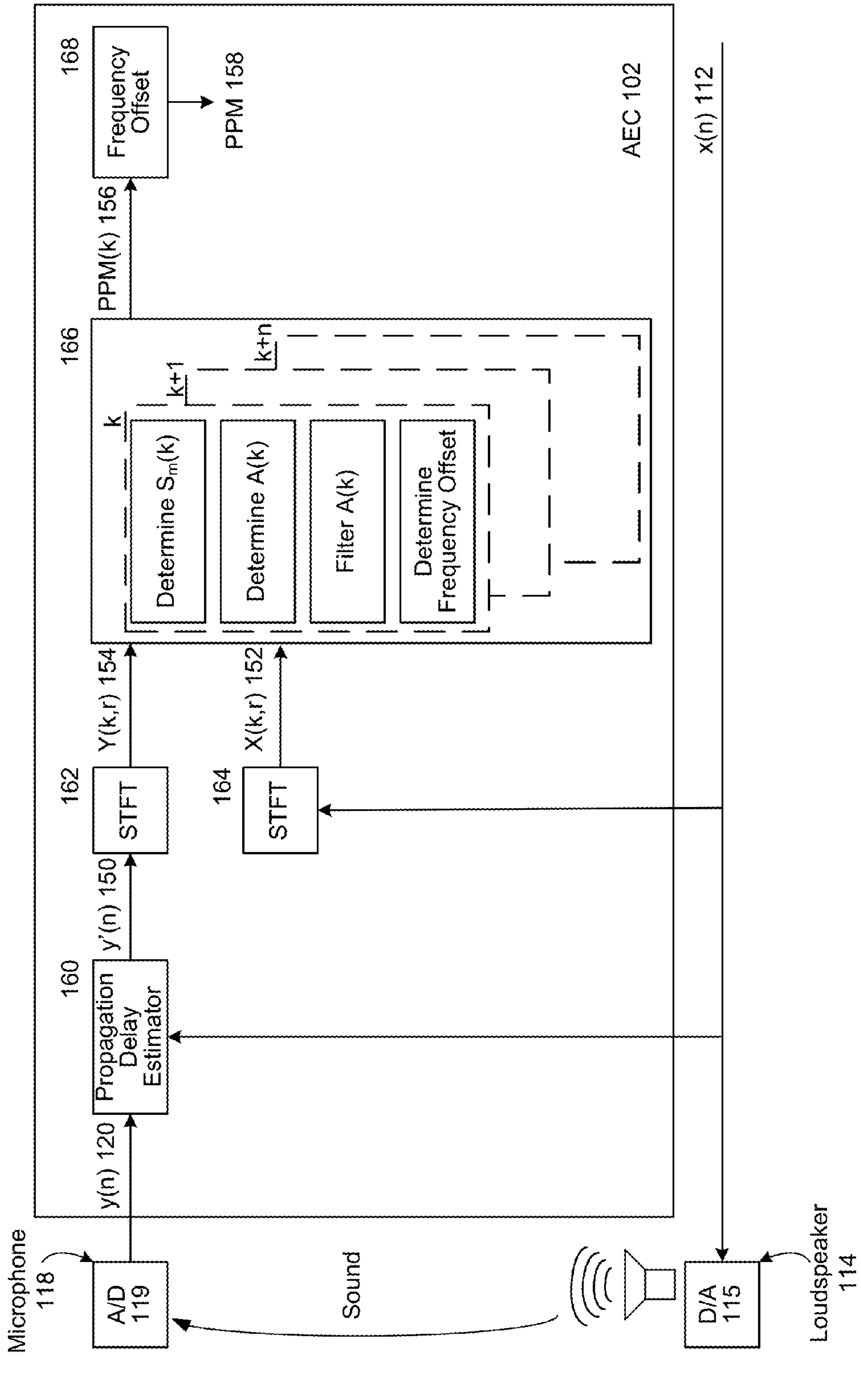

FIG. 1B illustrates the frequency domain operations of system 100. The time domain reference signal x(n) 112 is received by a loudspeaker 114, which performs a D/A conversion 115, with the analog signal being output by the loudspeaker 114 as sound. The sound is captured by a microphone 118 of the microphone array, and A/D conversion 119 is performed to convert the captured audio into the time domain signal y(n) 120.

The time domain input signal y(n) 120 and the time domain reference signal x(n) 112 are input to a propagation delay estimator 160 that determines the propagation delay and aligns the input signal y(n) 120 with the reference signal x(n) 112, generating aligned input signal y'(n) 150. The propagation delay estimator 160 may determine the propagation delay using techniques known to one of skill in the art and the aligned input signal y'(n) 150 is assumed to be determined for the purposes of this disclosure. For example, the propagation delay estimator 160 may identify a peak value in the reference signal x(n) 112, identify the peak value in the input signal y(n) 120 and may determine a propagation delay based on the peak values.

The AEC 102 applies a short-time Fourier transform (STFT) 162 to the aligned time domain signal y'(n) 150, producing the frequency-domain input values Y(k,r) 154, where the tone index "k" is 0 to N−1 and "r" is a frame index. The AEC 102 also applies an STFT 164 to the time-domain reference signal x(n) 112, producing the frequency-domain reference values X(k,r) 152.

The frequency-domain input values Y(k,r) 154 and the frequency-domain reference values X(k,r) 152 are input to block 166 to determine individual frequency offsets for each tone index "k," generating individual frequency offsets PPM(k) 156. For example, the AEC 102 may perform the steps of FIGS. 1A, 7, 8, 9 and/or 10 to determine a first frequency offset PPM(k) for a first tone index "k," a second frequency offset PPM(k+1) for a second tone index "k+1," a third frequency offset PPM(k+2) for a third tone index "k+2" and so on. The AEC 102 may determine individual frequency offsets for tone indices between a first frequency $K_1$ and a second frequency K2, as described in greater detail below with regard to FIG. 3.

The individual frequency offsets PPM(k) 156 may be input to block 168 and the AEC 102 may determine an overall frequency offset PPM 158, as described in greater detail above with regard to FIG. 1 and below with regard to FIG. 10. The AEC 102 may use the overall frequency offset PPM 158 to compress, add or remove samples from the reference values X(k,r) 152 and/or input values Y(k,r) 154 to compensate for a difference between a sampling rate of the loudspeaker 114 and a sampling rate of the microphone 118, as will be discussed in greater detail below. Thus, the AEC 102 may use the overall frequency offset PPM 158 to improve the echo cancellation.

As illustrated in FIG. 1A, the AEC 102 may calculate (132) a correlation matrix $S_m(k)$ for each frame index (m) and each tone index (k). For example, the AEC 102 may calculate the correlation matrix $S_m(k)$ using:

$$S_m(k)=\Sigma_{m=1}^{m=M} X_m(k)*\text{conj}(Y_m(k)) \quad [6]$$

where m is a current frame index, M is a number of previous frame indices, $X_m(k)$ corresponds to X(k,r) 152 and $Y_m(k)$ corresponds to Y(k,r) 154. The AEC 102 may determine a series of correlation matrix $S_m(k)$ values for Q consecutive frame indices.

$$SS(k)=[S_m(k)S_{m+1}(k)S_{m+2}(k) \ldots S_{m+Q-1}(k)] \quad [7]$$

The AEC 102 may determine (134) angles ($\alpha_m$) representing a rotation (e.g. phase difference) of $X_m(k)$ relative to $Y_m(k)$ for each frame index (m) and each tone index (k) for the series of Q consecutive frames. For example, the AEC 102 may calculate the angles using:

$$A(k)=[\alpha_1\alpha_2 \ldots \alpha_{Q-1}] \quad [8.1]$$

Where, $$\alpha_{j=angle(P(k))/(2*pi*k)} \quad [8.2]$$

and $$P(k)=S_{m+j}(k)*\text{conj}(S_{m+j-1}(k)) \quad [8.3]$$

After determining the angles A(k), the AEC 102 may remove (136) angles above a threshold. As the rate of rotation is relatively constant between adjacent frame indices, the angles should be within a range. Therefore, the AEC 102 may remove angles that exceed the range using the threshold (e.g., 40-100 ppm) to improve an estimate of the frequency offset.

The AEC 102 may determine (138) individual frequency offsets PPM(k) for each tone index k within a frequency range ($K_1$ to $K_2$) (e.g., 1 kHz to 4 kHz). For example, the AEC 102 may use linear regression and equation (9):

$$\text{PPM}(k)=b0/(2*\text{pi}*k0) \quad [9]$$

After determining the individual frequency offsets PPM (k) for each tone index k, the AEC 102 may determine (140) an overall frequency offset PPM. For example, the AEC 102 may use linear regression to the PPM(k) data set to determine the overall frequency offset PPM within the tone index range of $K_1$ to $K_2$ (e.g., 1 kHz to 4 kHz). The AEC 102 may compress/add/drop (142) samples to eliminate the frequency offset. For example, the AEC 102 may compress, add or remove samples from the reference values X(k,r) 152 and/or input values Y(k,r) 154 to compensate for a difference between a sampling rate of the loudspeaker 114 and a sampling rate of the microphone 118.

Figure 2A:
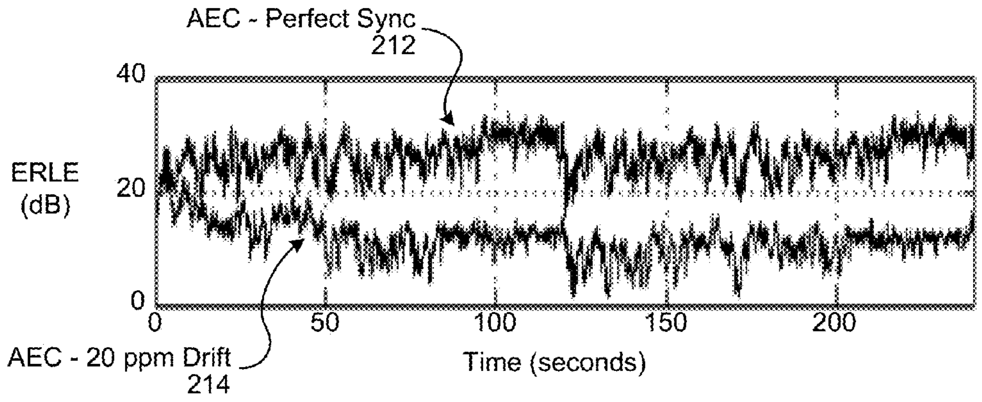
FIGS. 2A to 2C illustrate the reduction in echo-return loss enhancement (ERLE) caused by failing to compensate for frequency offset according to embodiments of the present disclosure.
Figure 2B:
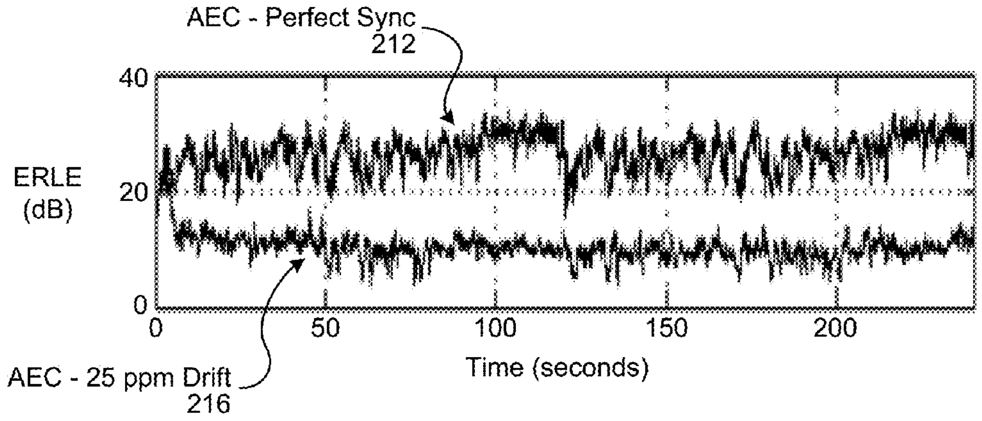
Figure 2C:
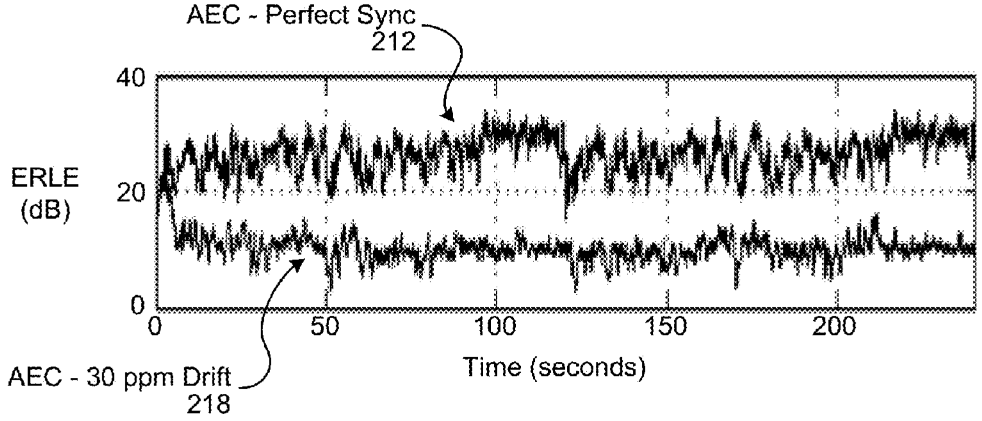

The performance of AEC is measured in ERLE (echo-return loss enhancement). FIGS. 2A, 2B, and 2C are ERLE plots illustrating the performance of conventional AEC with perfect clock synchronization 212 and with 20 ppm (214), 25 ppm (216) and 30 ppm (218) frequency offsets between the clocks associated with one of the loudspeakers and one of microphones.

As illustrated in FIGS. 2A, 2B, and 2C, if the sampling frequencies of the D/A and A/D converters are not exactly the same, then the AEC performance will be degraded dramatically. The different sampling frequencies in the microphone and loudspeaker path cause a drift of the effective echo path.

For normal audio playback, such differences in frequency offset are usually imperceptible to a human being. However, the frequency offset between the crystal oscillators of the AEC system, the microphones, and the loudspeaker will create major problems for multi-channel AEC convergence (i.e., the error e does not converge to zero). Specifically, the predictive accuracy of the estimated transfer functions (e.g., $\hat{h}_1(n)$ and $\hat{h}_2(n)$) will rapidly degrade as a predictor of the actual transfer functions (e.g., $h_1(n)$ and $h_2(n)$).

A communications protocol-specific solution to this problem has been to embed a sinusoidal pilot signal when transmitting reference signals "x" and receiving echo signals "y." Using a phase-locked loop (PLL) circuit, components can synchronize their clocks to the pilot signal, and/or estimate the frequency error. However, that requires that the communications protocol between components supports use of a pilot, and that each component supports clock synchronization.

Another alternative is to transmit an audible sinusoidal signal with the reference signals x. Such a solution does not require a specialized communications protocol, nor any particular support from components such as the loudspeakers and microphones. However, the audible signal will be heard by users, which might be acceptable during a startup or calibration cycle, but is undesirable during normal operations. Further, if limited to startup or calibration, any information gleaned as to frequency offsets will be static, such that the system will be unable to detect if the frequency offset changes over time (e.g., due to thermal changes within a component altering frequency of the component's clock).

Another alternative is to transmit an ultrasonic sinusoidal signal with the reference signals x at a frequency that is outside the range of frequencies that human beings can perceive. A first shortcoming of this approach is that it requires loudspeakers and microphones capable of operating at the ultrasonic frequency. Another shortcoming is that the ultrasonic signal will create a constant sound "pressure" on the microphones, potentially reducing the microphones' sensitivity in the audible parts of the spectrum.

To address these shortcomings of the conventional solutions, the acoustic echo cancellers 102a and 102b in FIG. 1B correct for frequency offsets between components based entirely on the transmitted and received audio signals (e.g., x(n) 112, y(n) 120) using frequency-domain calculation. No pilot signals are needed, and no additional signals need to be embedded in the audio. Compensation may be performed by adding or dropping samples to eliminate the ppm offset.

From definition of the PPM error in Equation 5, if the frequency offset is "A" ppm, then in 1/A samples, one additional sample will be added. This may be performed, for example, by adding on a duplicate of the last sample every 1/A samples. Hence, if difference is 1 ppm, then one additional sample will be created in $1/1e\text{-}6=10^6$ samples; if the difference is 20.833 ppm, then one additional sample will be added for every 48,000 samples; and so on. Likewise, if the frequency offset is "−A" ppm, then in 1/A samples, one additional sample will be dropped. This may be performed, for example, by dropping/skipping/removing the last sample every 1/A samples.

For the purposes of discussion, an example of system 100 includes "Q" loudspeakers 114 (Q>1) and a separate microphone array system (microphones 118) for hands free near-end/far-end multichannel AEC applications. The frequency offsets for each loudspeaker and the microphone array can be characterized as df1, df2, . . . , dfQ. Existing and well known solutions for frequency offset correction for LTE (Long Term Evolution cellular telephony) and WiFi (free running oscillators) are based on Fractional Delayed Interpolator methods. Fractional delay interpolator methods provide accurate correction with additional computational cost. Accurate correction is required for high speed communication systems. However, audio applications are not high speed and relatively simple frequency correction algorithm could be applied, such as a sample add/drop method. Hence, if playback of reference signals $x_1$ 112(a) (corresponding to loudspeaker 114a) is signal 1, and the frequency offset between signal 1 and the microphone output signal $y_1$ 120a is dfk, then frequency correction may be performed by dropping/adding one sample every 1/dfk samples.

The acoustic echo canceller(s) 102 uses short time Fourier transform-based frequency-domain multi-tap acoustic echo cancellation (STFT AEC) to estimate frequency offset. The following high level description of STFT AEC refers to echo signal y (120) which is a time-domain signal comprising an echo from at least one loudspeaker (114) and is the output of a microphone 118. The reference signal x (112) is a time-domain audio signal that is sent to and output by a loudspeaker (114). The variables X and Y correspond to a Short Time Fourier Transform of x and y respectively, and thus represent frequency-domain signals. A short-time Fourier transform (STFT) is a Fourier-related transform used to determine the sinusoidal frequency and phase content of local sections of a signal as it changes over time.

Using a Fourier transform, a sound wave such as music or human speech can be broken down into its component "tones" of different frequencies, each tone represented by a sine wave of a different amplitude and phase. Whereas a time-domain sound wave (e.g., a sinusoid) would ordinarily be represented by the amplitude of the wave over time, a frequency domain representation of that same waveform comprises a plurality of discrete amplitude values, where each amplitude value is for a different tone or "bin." So, for example, if the sound wave consisted solely of a pure sinusoidal 1 kHz tone, then the frequency domain representation would consist of a discrete amplitude spike in the bin containing 1 kHz, with the other bins at zero. In other words, each tone "k" is a frequency index. The response of a Fourier-transformed system, as a function of frequency, can also be described by a complex function.

Figure 3:
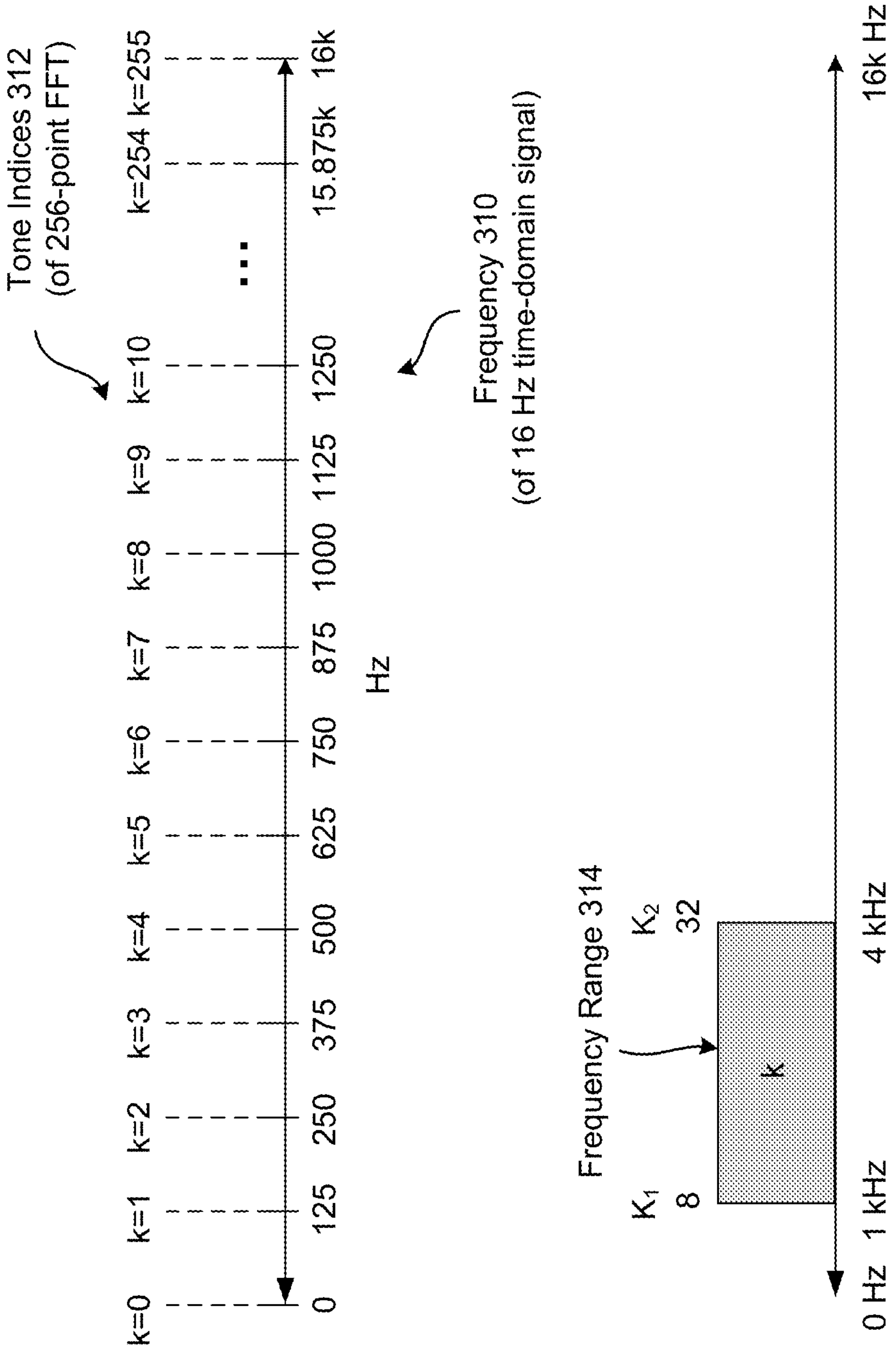
FIG. 3 illustrates an example of tone indices in a Fourier transform.

FIG. 3 illustrates an example of performing an N-point FFT on a time-domain signal. As illustrated in FIG. 3, if a 256-point FFT is performed on a 16 kHz time-domain signal, the output is 256 complex numbers, where each complex number corresponds to a value at a frequency in increments of 16 kHz/256, such that there is 125 Hz between points, with point 0 corresponding to 0 Hz and point 255 corresponding to 16 kHz. As illustrated in FIG. 3, each tone index 312 in the 256-point FFT corresponds to a frequency 310 in the 16 kHz time-domain signal.

In addition, the AEC 102 may determine the frequency offset using only a portion of the overall FFT (corresponding to a portion of the time-domain signal). For example, FIG. 3 illustrates determining the frequency offset using a frequency range 314 from $K_1$ to $K_2$ that corresponds to tone index 8 through tone index 32 (e.g., 1 kHz to 4 kHz). In some examples, the AEC 102 may use the tone indices 312 generated from the entire time-domain signal (e.g., tone indices 0 through 255). In other examples, the AEC 102 may use the tone indices 312 generated from a portion of the time-domain signal, using the overall numbering (e.g., tone indices 8 through 32). However, the present disclosure is not limited thereto and the AEC 102 may renumber the tone indices corresponding to the portion of the time-domain signal (e.g., tone indices 0 through 24) without departing from the present disclosure.

If the STFT is an "N" point Fast Fourier Transform (FFT), then the frequency-domain variables would be X(k,r) and Y(k,r), where the tone "k" is 0 to N−1 and "r" is a frame index. The STFT AEC uses a "multi-tap" process. That means for each tone "k" there are M taps, where each tap corresponds to a sample of the signal at a different time. Each tone "k" is a frequency point produced by the transform from time domain to frequency domain, and the history of the values across iterations is provided by the frame index "r." The STFT taps would be W(k,m), where k is 0 to N−1 and m is 0 to M−1. The tap parameter M is defined based on tail length of AEC. The "tail length," in the context of AEC, is a parameter that is a delay offset estimation. For example, if the STFT processes tones in 8 ms samples and the tail length is defined to be 240 ms, then M=240/8 which would correspond to M=32.

Given a signal z[n], the STFT Z(k,r) of x[n] is defined by $$Z(k,r)=\Sigma_{n=0}^{N-1}Win(n)*z(n+r*R)*e^{-2pi*k*n/N} \quad [10.1]$$

Where, Win(n) is a window function for analysis, k is a frequency index, r is a frame index, R is a frame step, and N is an FFT size. Hence, for each block (at frame index r) of N samples, the STFT is performed which produces N complex tones X(k,r) corresponding frequency index k and frame index r.

Referring to the Acoustic Echo Cancellation using STFT operations in FIG. 1B, y(n) 120 is the input signal from the microphone 118 and Y(k,r) is the STFT representation:

$$Y(k,r)=\Sigma_{n=0}^{N-1}Win(n)*y(n+r*R)*e^{-2pi*k*n/N} \quad [10.2]$$

The reference signal x(n) 112 to the loudspeaker 114 has a frequency domain STFT representation:

$$X(k,r)=\sum_{n=0}^{N-1} Win(n)*x(n+r*R)*e^{-2pi*k*n/N} \quad [10.3]$$

As noted above, each tone "k" can be represented by a sine wave of a different amplitude and phase, such that each tone may be represented as a complex number. A complex number is a number that can be expressed in the form a+bj, where a and b are real numbers and j is the imaginary unit, that satisfies the equation $j^2=-1$. A complex number whose real part is zero is said to be purely imaginary, whereas a complex number whose imaginary part is zero is a real number. For a sine wave of a given frequency, the real component corresponds to an amplitude of the wave while the imaginary component corresponds to the phase. In addition, the complex conjugate of a complex number is the number with equal real part and imaginary part equal in magnitude but opposite in sign. For example, the complex conjugate of 3+4i is 3-4i.

Figure 4:
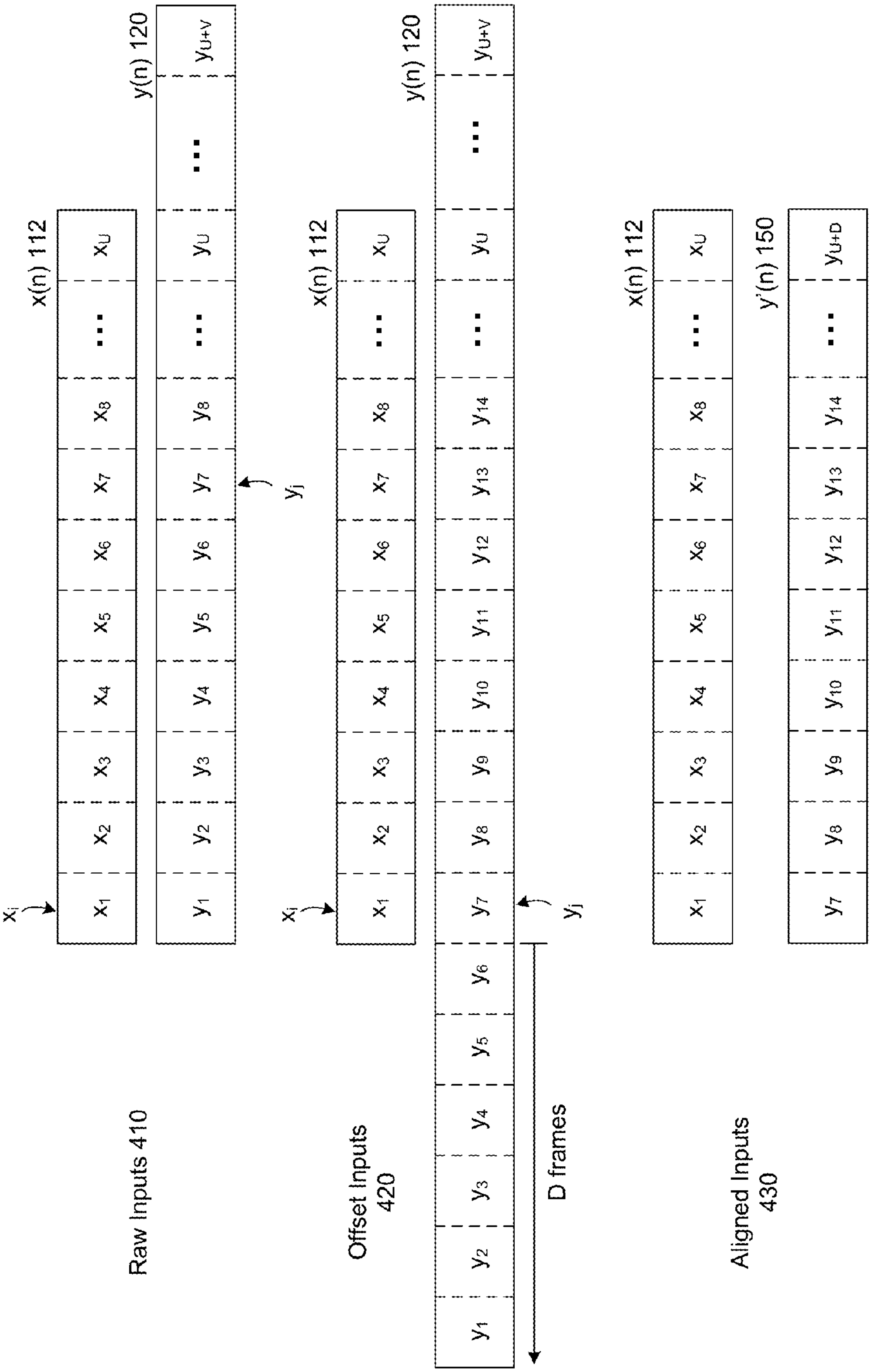
FIG. 4 illustrates an example of aligning signals prior to calculating the frequency offsets according to embodiments of the present disclosure.

As mentioned above, in order to determine a frequency offset between the loudspeaker 114 and the microphone 118, the AEC 102 may determine a propagation delay and generate an aligned input y'(n) 150 from the input y(n) 120. FIG. 4 illustrates an example of aligning signals prior to calculating the frequency offsets according to embodiments of the present disclosure. As illustrated in FIG. 4, raw inputs 410 include x(n) 112 and y(n) 120. Reference signal x(n) 112 is illustrated as a series of frame indices (e.g., 1 to U, where U is a natural number) and is associated with the reference signal sent to the loudspeaker 114. Input signal y(n) 120 is illustrated as a series of frame indices (e.g., 1 to U+V, where V is a natural number) and is associated with the input received by the microphone 118. As the AEC 102 needs to determine a propagation delay between the loudspeaker 114 and the microphone 118, y(n) 120 includes additional frame indices, with V being a maximum frame index delay between the loudspeaker 114 and the microphone 118.

To determine the propagation delay, the AEC 102 may determine a coherence between individual index frames in x(n) 112 and y(n) 120. Coherence means that a frame ($x_i$) in x(n) 112 corresponds to a frame ($y_j$) in y(n) 120, and the propagation delay (D) is determined based on the difference between the two (e.g., D=j−i). Thus, the AEC 102 may determine that $x_i$ (e.g., $x_1$) corresponds to $y_j$ (e.g., $y_7$) and may determine the propagation delay accordingly (e.g., D=7−1=6 frames).

Using the propagation delay, the AEC 102 may shift y(n) 120 by D frames (e.g., 6 frames), illustrated in FIG. 4 as offset inputs 420. Thus, $x_i$ (e.g., $x_1$) is aligned with $y_j$ (e.g., $y_7$), although x(n) 112 ends at $x_U$ while y(n) 120 continues until $y_{U+V}$. Therefore, the AEC 102 generates aligned inputs 430 with x(n) 112 extending from $x_1$ to $x_U$ while aligned input y'(n) 150 extends from $y_7$ to $y_{U+D}$.

After the propagation offset is removed and the x(n) 112 is aligned with y'(n) 150, the AEC 102 may generate a Fourier transform of x(n) 112 to generate X(k,r) 152 and may generate a Fourier transform of y'(n) 150 to generate Y(k,r) 154. Therefore, the propagation delay (D) is accounted for and X(k,r) 152 extends from $X_1$ to $X_U$ and Y(k,r) 154 extend from $Y_1$ to $Y_U$. Thus, $X_1$ corresponds to $Y_1$, $X_2$ corresponds to $Y_2$, and so on.

Figure 5:
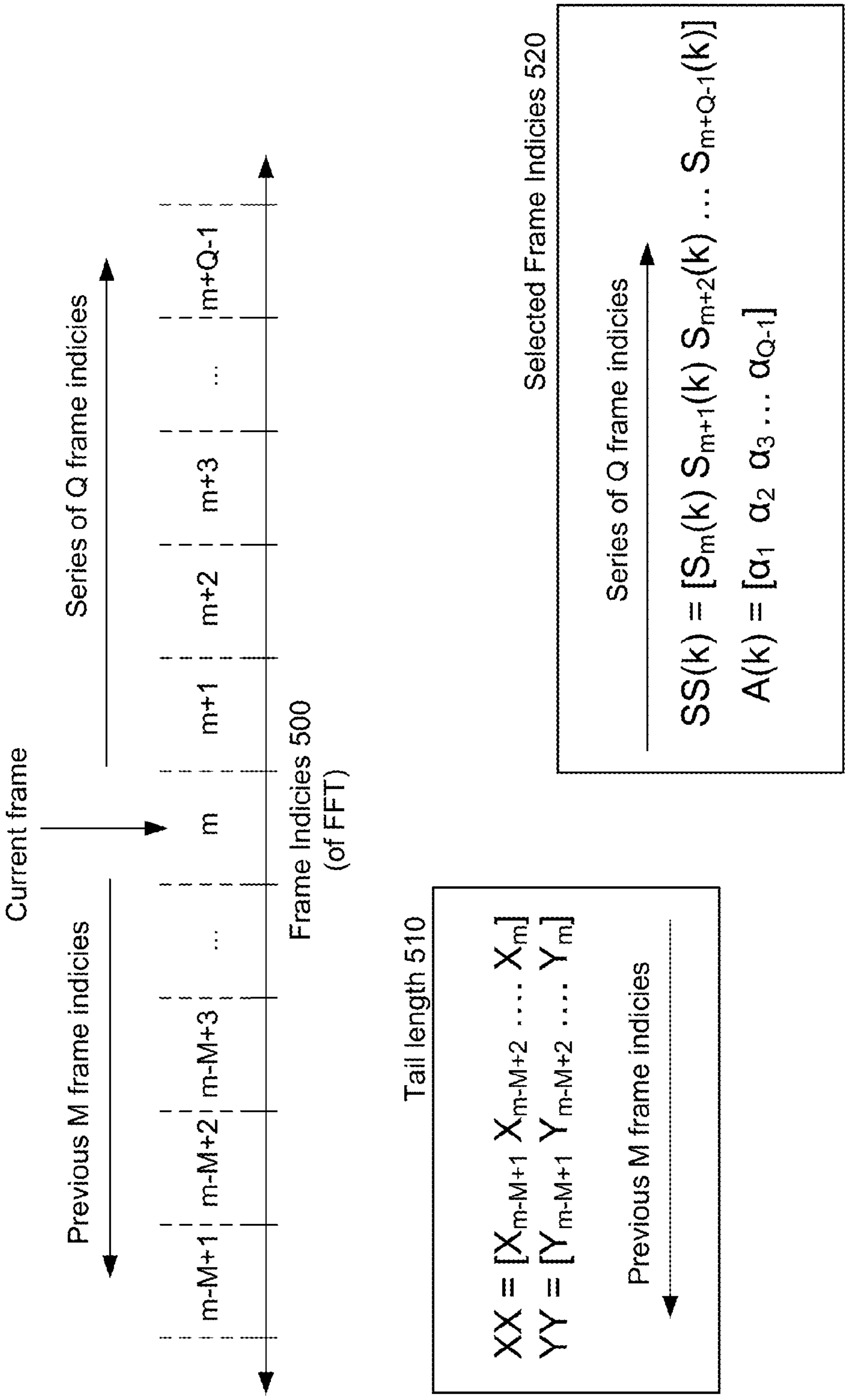
FIG. 5 illustrates an example of frame indices according to embodiments of the present disclosure.

To provide clarity for subsequent equations and explanations, FIG. 5 illustrates an example of frame indices according to embodiments of the present disclosure. As illustrated in FIG. 5, frame indices 500 may be associated with X(n) 152 and/or Y(n) 154 and may include a current frame m, previous M frame indices and subsequent Q frame indices. For example, for a given frame m the Short Term Fourier Transform (STFT) may include the previous M frame indices (e.g., m−M+1 to m), and a series of Q transforms may be calculated from frame m to frame m+Q−1. Thus, a transform associated with frame m would include the previous M frame indices from m−M+1 to m (as illustrated by tail length 510), a transform associated with frame m+1 would include the previous M frame indices from m−M+2 to m+1 and so on until frame m+Q−1, which would include the previous M frame indices from m+Q−M to m+Q−1. The length of the subsequent Q frame indices may vary and is illustrated by the selected frame indices 520. For each frame index in the selected frame indices 520, the AEC 102 may determine an S(k) value and an angle α, as will be discussed in greater detail below.

Figure 6A:
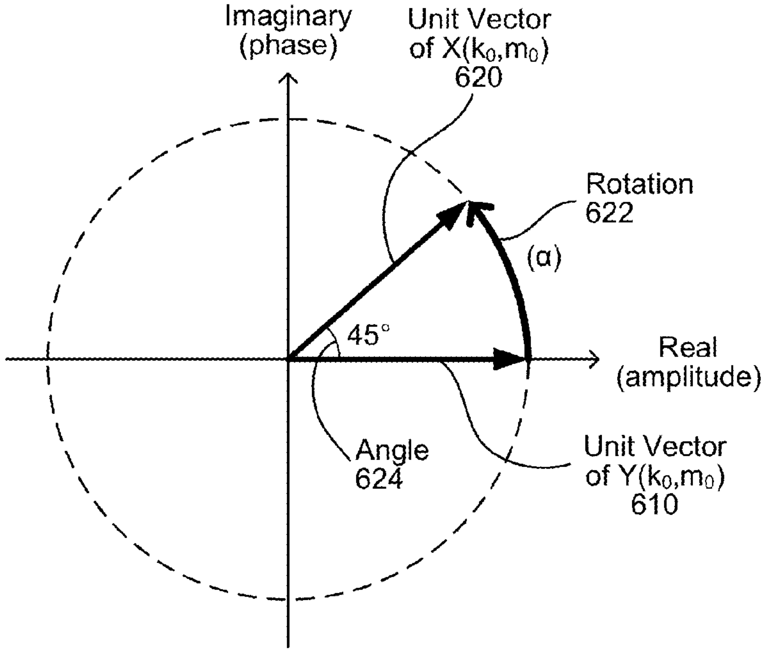
FIGS. 6A to 6B illustrate the relationship between an input signal and a reference signal with a frequency offset according to embodiments of the present disclosure.

As the representation of each tone k is a complex value, each entry in the matrixes X(k, m) and Y(k,m) may likewise be a complex number. FIG. 6A illustrates an example of unit vectors corresponding to matrixes X(k, m) and Y(k, m) and a corresponding rotation caused by a frequency offset. However, it is not necessary to take a unit vector, and instead the complex value may be normalized. Plotted onto a "real" amplitude axis and an "imaginary" phase axis, each complex value results in a two-dimensional vector with a magnitude of 1 and an associated angle.

If there is no frequency offset between the microphone echo signal y(n)120 and the loudspeaker reference signal x(n) 112, then X(k,m) will have a zero mean phase rotation relative to Y(k,m) (e.g., equal in amplitude and phase). In the alternative, if there is a frequency offset (equal to A PPM) between y(n) 120 and x(n) 112, then the frequency offset will create continuous delay (i.e., will result in the adding/dropping of samples in the time domain). Such a delay will correspond to a phase "rotation" in frequency domain (e.g., equal in amplitude, different in phase). For example, the frequency offset may result in a rotation in the frequency domain between X(k,m) and Y(k,m) for an index value m. If the frequency offset is positive, the rotation will be clockwise. If the frequency offset is negative, the rotation will be counterclockwise. The rotation may be determined by taking a correlation matrix between X(k,m) and Y(k,m) for a series of frames and comparing the correlation matrixes between frames. The speed of the rotation of the angle from frame to frame corresponds to the size of the offset, with a larger offset producing a faster rotation than a smaller offset.

FIG. 6A illustrates the unit vector of X(k,m) and the unit vector Y(k,m) for a first frame index $m_0$ and a first tone index $k_0$. Thus, FIG. 6A illustrates $X(k_0,m_0)$ 620-1 and $Y'(k_0,m_0)$ 610-1. As illustrated in FIG. 6A, $Y'(k_0,m_0)$ 610-1 has a phase of 0 degrees whereas $X(k_0,m_0)$ 620-1 has a phase of 45 degrees, resulting in $X(k_0,m_0)$ having a frequency offset that corresponds to a rotation 622 having an angle 624 of 45 degrees relative to $Y(k_0,m_0)$.

Figure 6B:
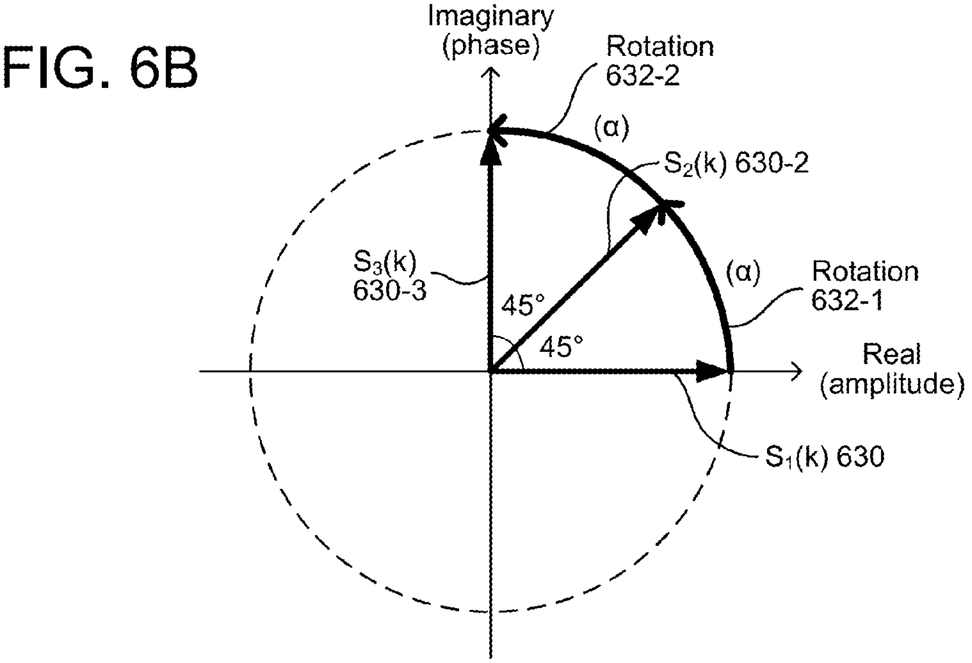

To determine the frequency offset and corresponding rotation 622, the AEC 102 may determine a rotation between a first correlation matrix and a second correlation matrix. For example, FIG. 6B illustrates a first correlation matrix $S_1(k)$ 630-1 having an angle of 0 degrees, a second correlation matrix $S_2(k)$ 630-2 having an angle of 45 degrees and a third correlation matrix $S_3(k)$ 630-3 having an angle of 90 degrees. Therefore, a first rotation 632-1 between the first correlation matrix $S_1(k)$ 630-1 and the second correlation matrix $S_2(k)$ 630-2 is 45 degrees and a second rotation 632-2 between the second correlation matrix $S_2(k)$ 630-2 and the third correlation matrix $S_3(k)$ 630-3 is 45 degrees. A rate of rotation may be constant between subsequent correlation matrixes, such that a first correlation matrix may have an angle equal to one rotation, a second correlation matrix may have an angle equal to two rotations and a third correlation matrix may have an angle equal to three rotations. For example, the first correlation matrix $S_1(k)$ 630-1 may correspond to 0, the second correlation matrix $S_2(k)$ 630-2 may correspond to a (e.g., 45 degrees) and the third correlation matrix $S_3(k)$ 630-3 may correspond to 2α (e.g., 90 degrees).

Thus, if the frequency offset is "A" ppm, then each tone k and for each frame time, the angle will be rotated by 2*π*k*A.

Figure 7:
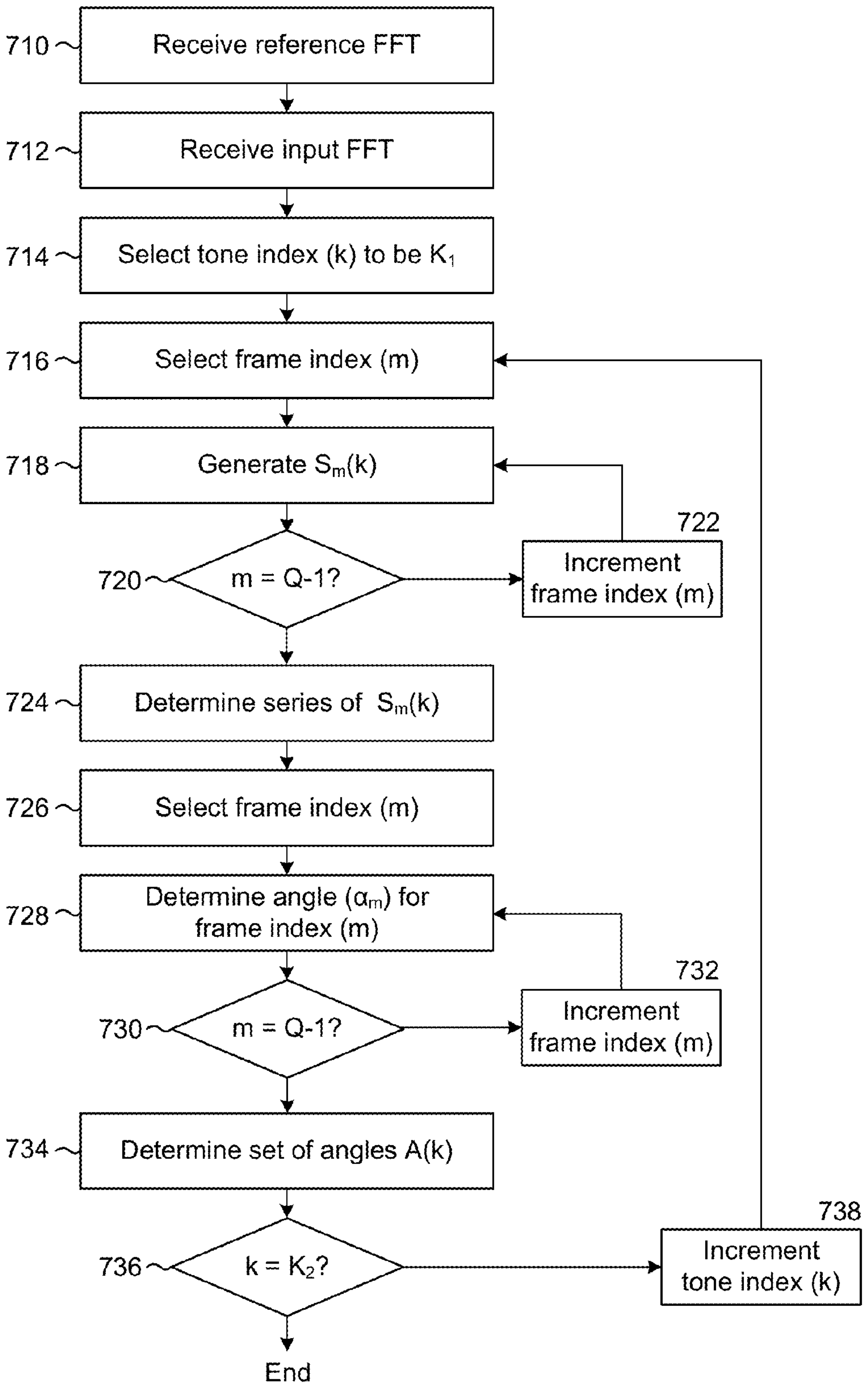
FIG. 7 is a flowchart conceptually illustrating an example method for determining a set of angles according to embodiments of the present disclosure.

FIG. 7 is a flowchart conceptually illustrating an example method for determining a set of angles according to embodiments of the present disclosure. As illustrated in FIG. 7, the AEC 102 may receive (710) a reference FFT and receive (712) an input FFT that is aligned with the reference FFT, as discussed above with regard to FIG. 4. The AEC 102 may select (714) a tone index (k) corresponding to a beginning (e.g., $K_1$) of a desired range. The AEC 102 may select (716) a frame index (m) and generate (718) a correlation matrix $S_m(k)$ for the selected frame index (m) using Equation 6. The AEC 102 may determine (720) if the frame index (m) is equal to a maximum frame index (Q) and if not, may increment (722) the frame index (m) and repeat step 718. If the frame index (m) is equal to a maximum frame index (Q), the AEC 102 may determine (724) a series of correlation matrix $S_m(k)$ values using Equation 7, the series including the correlation matrix $S_m(k)$ values calculated in step 718 for each of the frame index (m).

The AEC 102 may select (726) a frame index (m) and may determine (728) an angle $\alpha_m$ for the frame index (m) using Equations 8.2-8.3. The AEC 102 may determine (730) if the frame index (m) is equal to a maximum frame index (Q) and if not, may increment (732) the frame index (m) and repeat step 728. If the frame index (m) is equal to a maximum frame index (Q), the AEC 102 may determine (734) a set of angles A(k) using Equation 8.1. The AEC 102 may determine (736) if the tone index (k) is equal to a maximum tone index ($K_2$) and if not, may increment (738) the tone index (k) and repeat steps 716-736. If the tone index (k) is equal to a maximum tone index ($K_2$), the process may end. Thus, the AEC 102 may determine a set of angles A(k) using a series of Q frames for each tone index (k) between $K_1$ and $K_2$ (e.g., 1 kHz and 4 kHz).

Figure 8:
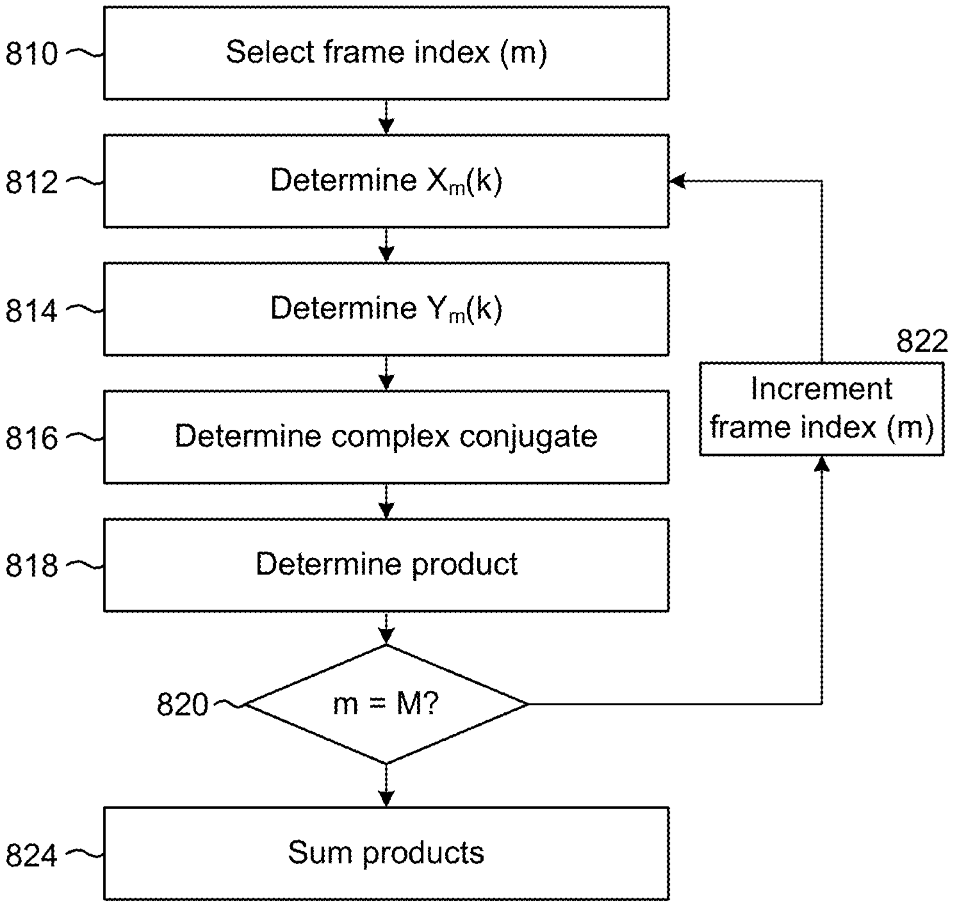
FIG. 8 is a flowchart conceptually illustrating an example method for determining a summation according to embodiments of the present disclosure.

FIG. 8 is a flowchart conceptually illustrating an example method for determining a summation according to embodiments of the present disclosure. As discussed above with regard to step 132 in FIG. 1A, the AEC 102 may calculate a correlation matrix $S_m(k)$ using:

$$S_m(k)=\Sigma_{m=1}^{m=M}X_m(k)*\mathrm{conj}(Y_m(k)) \quad [6]$$

where m is a current frame index, M is a number of previous frame indices, $X_m(k)$ corresponds to X(k,r) 152 and $Y_m(k)$ corresponds to Y(k,r) 154. As illustrated in FIG. 8, the AEC 102 may select (810) a frame index (m), may determine (812) $X_m(k)$, may determine (814) $Y_m(k)$, may determine (816) a complex conjugate of $Y_m(k)$ and may determine (818) a product of $X_m(k)$ and the complex conjugate of $Y_m(k)$. The AEC 102 may determine (820) if the frame index (m) is equal to a maximum frame index (M) and if not, may increment (722) the frame index (m) and repeat step 712. If the frame index (m) is equal to the maximum frame index (M), the AEC 102 may sum (824) each of the products calculated in step 818 for each of the frame index (m) to generate the correlation matrix $S_m(k)$.

Figure 9:
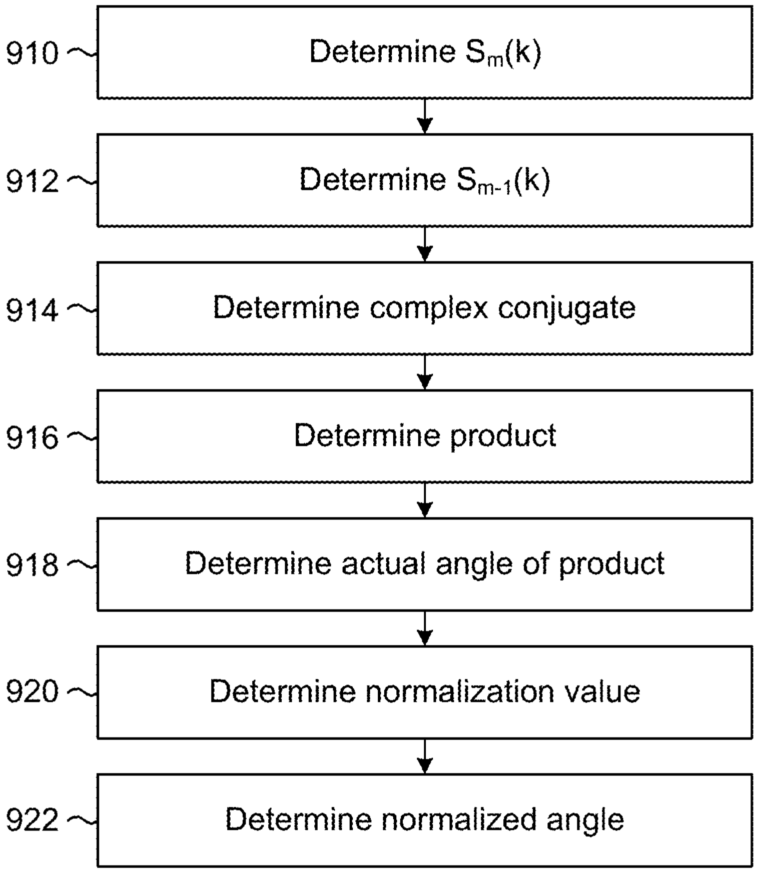
FIG. 9 is a flowchart conceptually illustrating an example method for determining an angle according to embodiments of the present disclosure.

FIG. 9 is a flowchart conceptually illustrating an example method for determining an angle according to embodiments of the present disclosure. As discussed above with regard to step 134 in FIG. 1A, the AEC 102 may calculate an angle ($\alpha_m$) representing a rotation (e.g. phase difference) of $X_m(k)$ relative to $Y_m(k)$ for each frame index (m) and each tone index (k) for the series of Q consecutive frames using Equations 8.1-8.3.

$$A(k)=[\alpha_1\alpha_2 \ldots \alpha_{Q-1}] \quad [8.1]$$

Where, $$\alpha_{j=angle(P(k))/(2*pi*k)} \quad [8.2]$$

and $$P(k)=S_{m+j}(k)*\mathrm{conj}(S_{m+j-i}(k)) \quad [8.3]$$

As illustrated in FIG. 9, the AEC 102 may determine (910) a current correlation matrix $S_m(k)$ for a frame index (m), may determine (912) a previous correlation matrix $S_{m-1}(k)$ for the frame index (m), may determine (914) a complex conjugate of $S_{m-1}(k)$ and may determine (916) a product of the current correlation matrix $S_m(k)$ and the complex conjugate of the previous correlation matrix $S_{m-1}(k)$. The AEC 102 may determine (918) an actual angle of the product, may determine (920) a normalization value and may determine (922) a normalized angle by dividing the actual angle by the normalization value.

Figure 10:
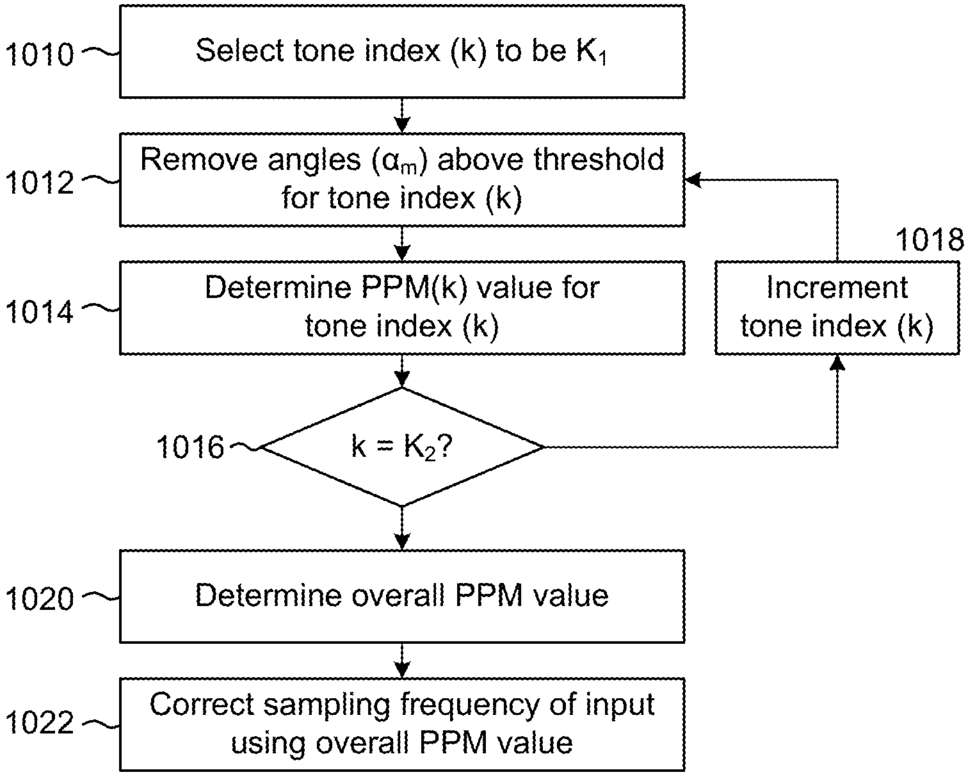
FIG. 10 is a flowchart conceptually illustrating an example method for determining an overall frequency offset according to embodiments of the present disclosure.

FIG. 10 is a flowchart conceptually illustrating an example method for determining an overall frequency offset according to embodiments of the present disclosure. The AEC 102 may determine the overall frequency offset PPM using the set of angles A(k) for each tone index (k) determined in FIG. 7. For example, after determining the sets of angles A(k), the AEC 102 may select (1010) a tone index (k) corresponding to a beginning (e.g., $K_1$) of a desired range and may remove (1012) angle above a threshold for the tone index (k). As the rate of rotation is relatively constant between adjacent frame indices, the angles should be within a range. Therefore, the AEC 102 may remove angles that exceed the range using the threshold (e.g., 40-100 ppm) to improve an estimate of the frequency offset. The AEC 102 may determine (1014) individual frequency offsets PPM(k) for the tone index (k) using linear regression and/or Equation 9.

The AEC 102 may determine (1016) if the tone index (k) corresponds to an ending (e.g., $K_2$) of the desired range and if not, may increment (1018) the tone index (k) and repeat step 1012. If the tone index (k) corresponds to the ending (e.g., $K_2$), the AEC 102 may determine (1020) an overall frequency offset (PPM) value using linear regression and the individual frequency offsets (PPM(k)). The AEC 102 may then correct (1022) a sampling frequency of an input using the overall frequency offset (PPM) value.

For example, the AEC 102 may compress, add or remove samples from the reference values X(k,r) 152 and/or input values Y(k,r) 154 to compensate for a difference between a sampling rate of the loudspeaker 114 and a sampling rate of the microphone 118. The value of the frequency offset is used to determine how many samples to add or subtract from the reference signals x(n) 112 and/or input signals y(n) 120 input into the AEC 102. If the PPM value is positive, samples are added (i.e., repeated) to x(n) 112/y(n) 120. If the PPM value is negative, samples are dropped from x(n) 112/y(n) 120. For example, if the frequency offset indicates that there is a different of 1 ppm between the reference signal x(n) 112 and the input signal y(n) 120, the AEC 102 may drop one sample for every million samples to correct the offset. The AEC 102 may add/drop samples from the reference signal x(n) 112 or the input signal y(n) 120 depending on a system configuration. For example, if the AEC 102 receives a single reference signal and a single input signal, the AEC 102 may add/drop samples from the signal having a higher frequency, as the higher frequency will be able to add/drop samples more quickly to align the signals. However, if the AEC 102 receives a single reference signal and ten input signals, the AEC 102 may add/drop samples from the reference signal regardless of frequency if the ten input signals have the same frequency offset. In some examples, the AEC 102 may add/drop samples from the ten input signals individually if the frequency offsets change between the input signals.

Adding and/or dropping samples may be performed, among other ways, by storing the reference signal x(n) 112 received by the AEC 102 in a circular buffer (e.g., 162*a*, 162*b*), and then by modifying read and write pointers for the buffer, skipping or adding samples. In a system including multiple microphones 118, each with a corresponding AEC 102, the AEC 102 may share circular buffer(s) 162 to store the reference signals x(n) 112, but each AEC 102 may independently set its own pointers so that the number of samples skipped or added is specific to that AEC 102.

Figure 11:
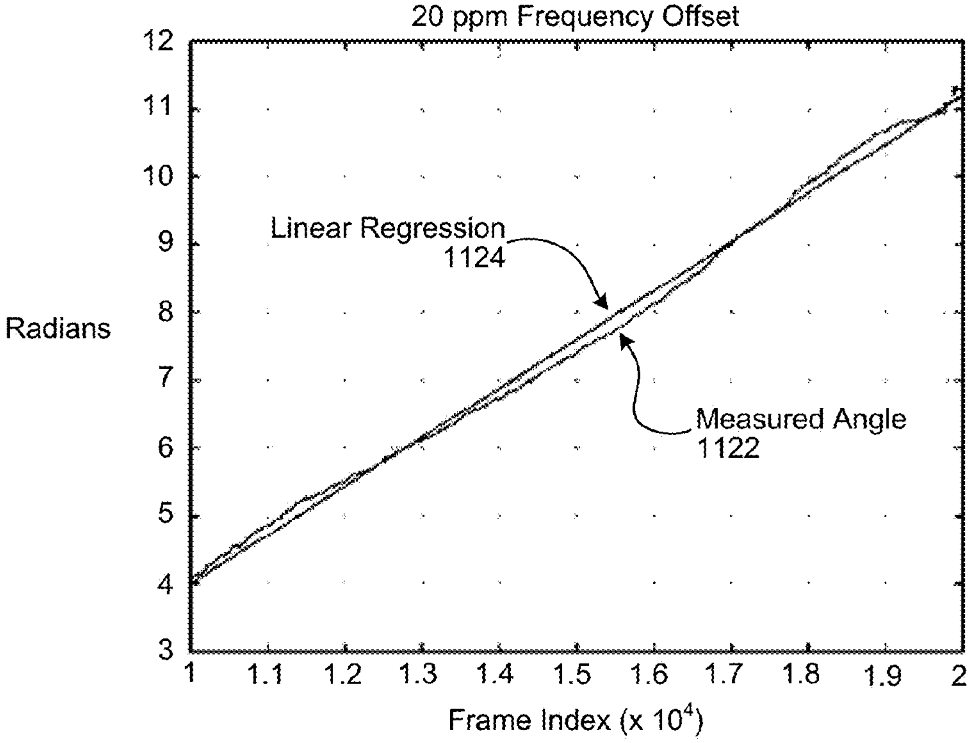
FIGS. 11 to 14 illustrate the ability of the process in FIG. 7 to accurately estimate the angles used to determine the frequency offset.
Figure 12:
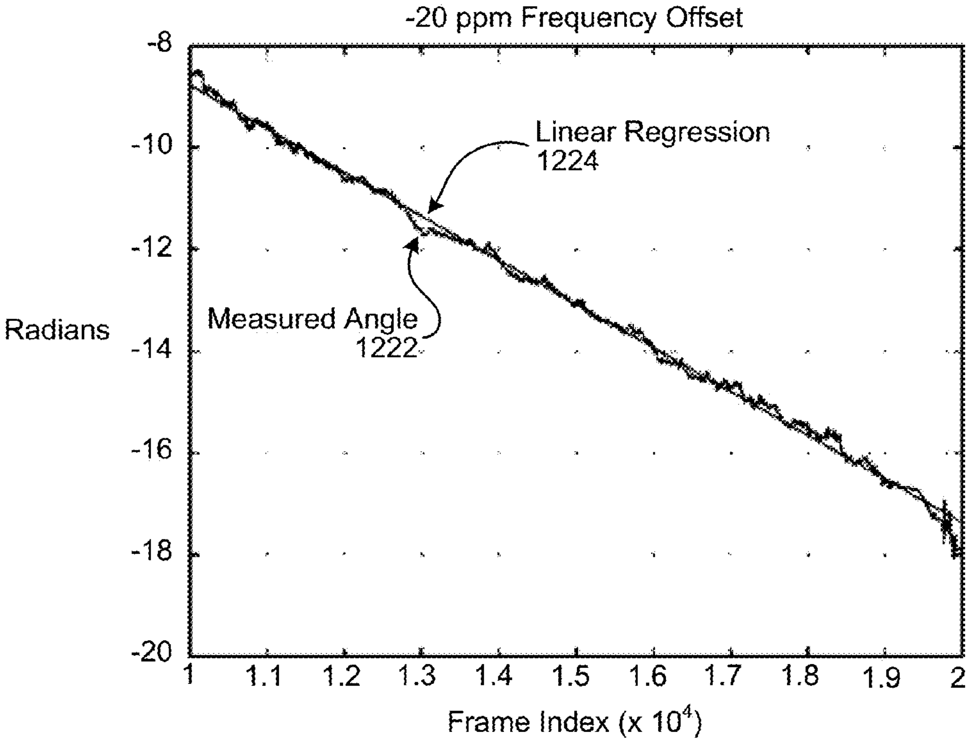
Figure 13:
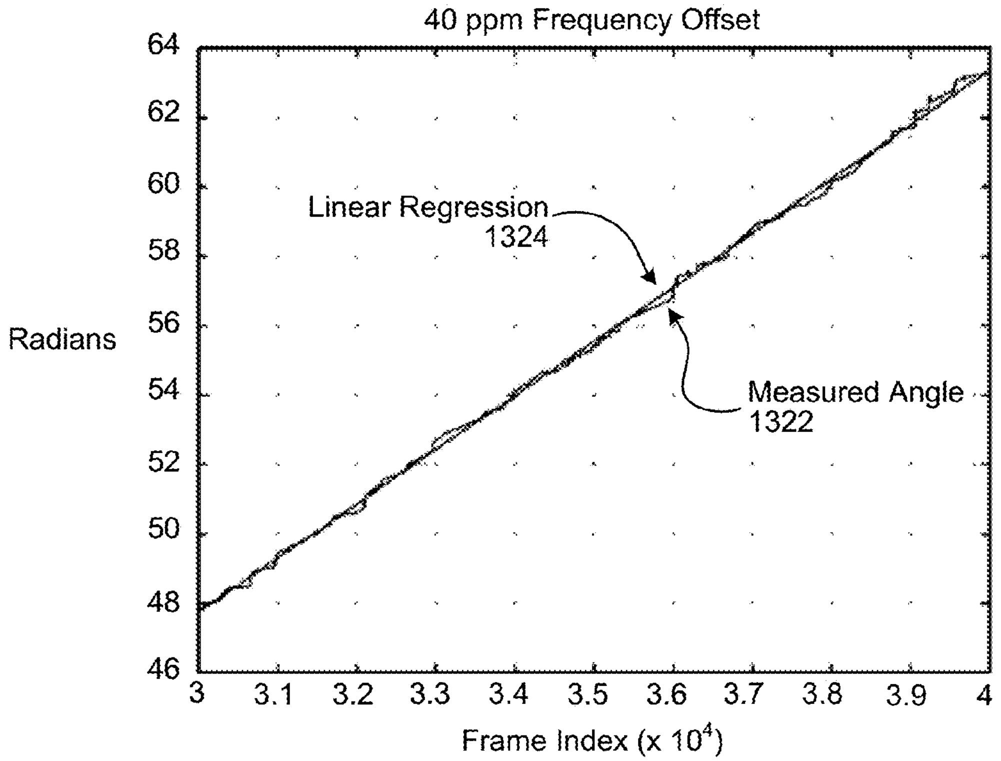
Figure 14:
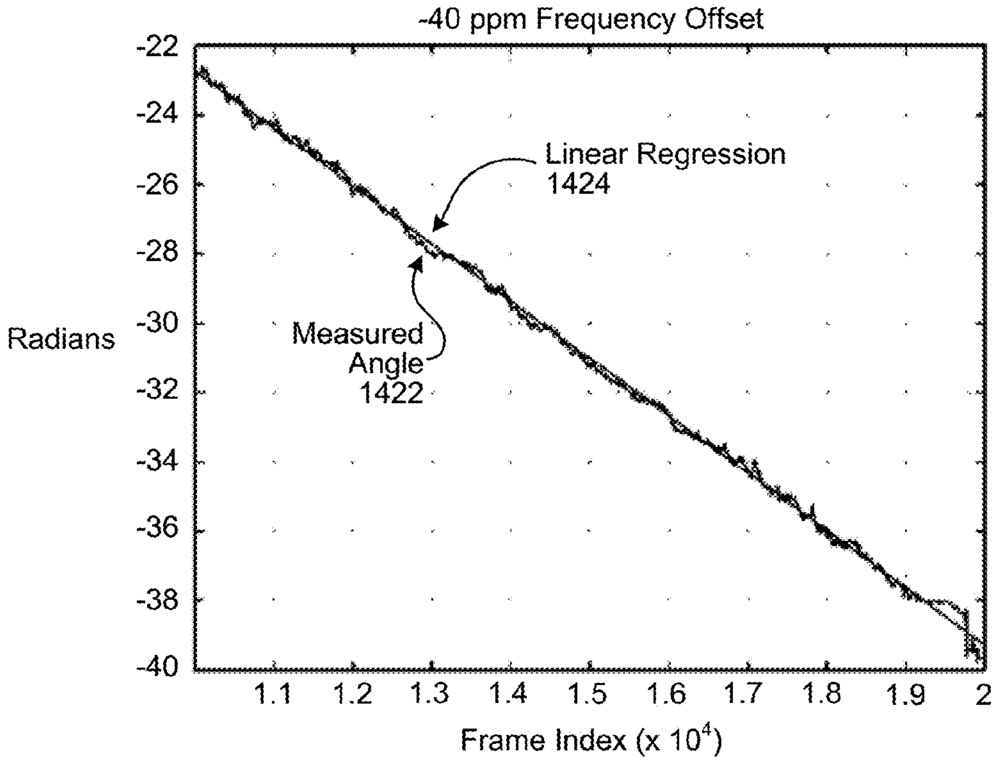

FIG. 11 is a graph illustrating a comparison of the angles measured 1122 from coefficients known to include a 20 PPM frequency offset, in comparison to the angles "u" 1124 determined by linear regression. FIG. 12 illustrates a comparison of the measured angles 1222 for coefficients known to include a−20 PPM frequency offset, in comparison to the angles 1224 determined by linear regression. FIG. 13 illustrates a comparison of the measured angles 1322 for coefficients known to include a 40 PPM frequency offset, in comparison to the angles 1324 determined by linear regression. FIG. 14 illustrates a comparison of the measured angles 1422 for coefficients known to include a−40 PPM offset, in comparison to the angles 1424 determined by linear regression. As illustrated in FIGS. 11 to 14, the process in FIG. 7 provides a fairly accurate measure of rotation.

As an additional feature, AEC systems generally do not handle large signal propagation delays "D" well between the reference signals x(n) 112 and the echo signals y(n) 120. While the PPM for a system may change over time (e.g., due to thermal changes, etc.), the propagation delay time D remains relatively constant. The STFT AEC "taps" as described above may be used to accurately measure the propagation delay time D for each channel, which may then be used to set the delay provided by each of the buffers 162.

For example, assume that the microphone echo signal y(n) 120 and reference signal x(n) 112 are not properly aligned. Then, there would be a constant delay D (in samples) between the transmitted reference signals x(n) 112 and the received echo signals y(n) 120. This delay in the time domain creates a rotation in frequency domain.

If x(t) is the time domain signal and X(f) is the corresponding Fourier transform of x(t), then the Fourier transform of x(t−D) would be X(f)*exp(−j*f*D).

If echo cancellation algorithm is designed with long tail length (the number of taps of AEC frequency impulse response (FIR) filter is long enough), then the AEC will converge with initial D taps close to zero. Simply, AEC will lose first D taps. If D is large (e.g., D could be 100 ms or larger), then impact on AEC performance will be large. Hence, the delay D should be measured and should be compensated.

Figure 15:
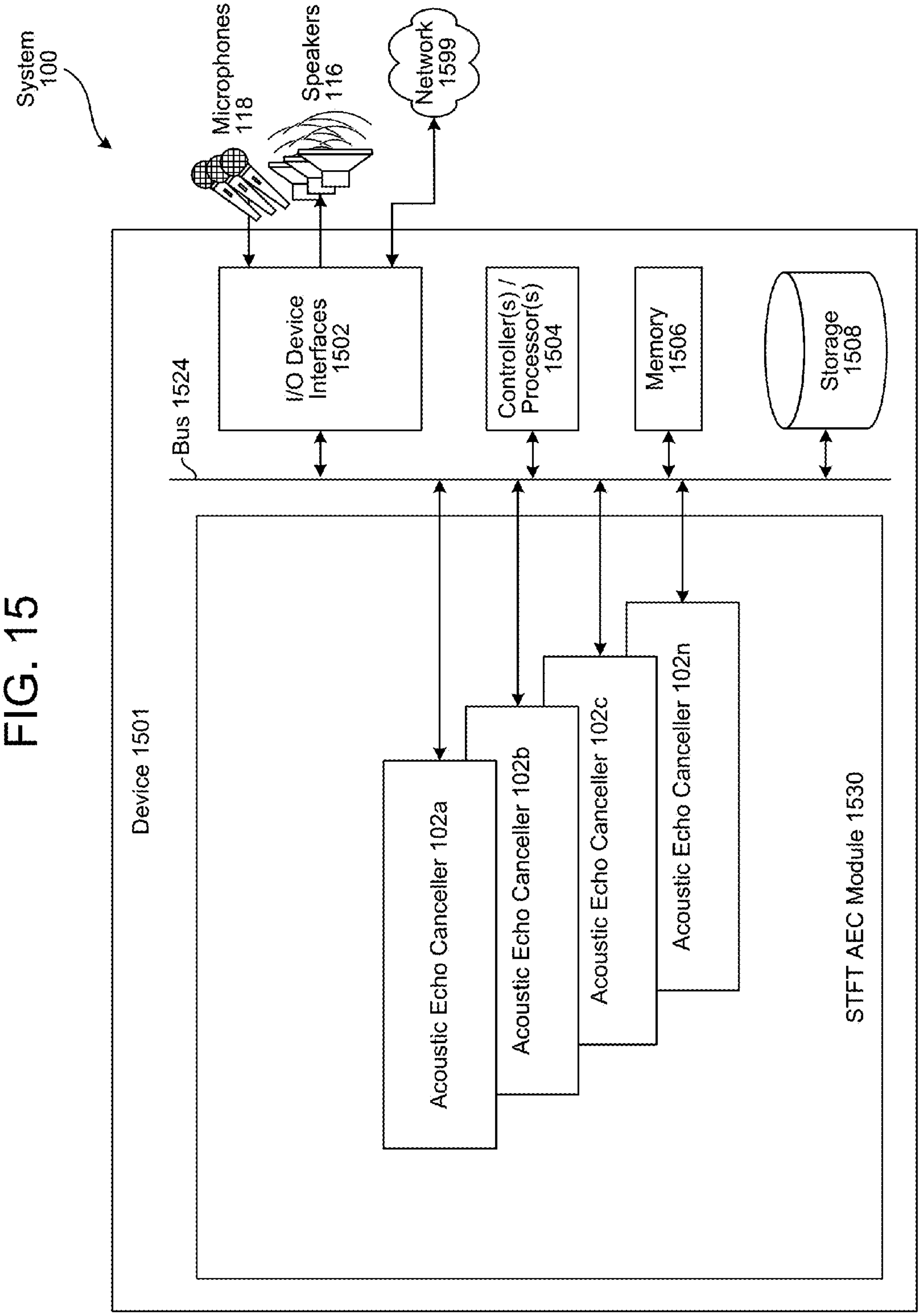
FIG. 15 is a block diagram conceptually illustrating example components of a system for echo cancellation according to embodiments of the present disclosure.

FIG. 15 is a block diagram conceptually illustrating example components of the system 100. In operation, the system 100 may include computer-readable and computer-executable instructions that reside on the device 1501, as will be discussed further below.

The system 100 may include one or more audio capture device(s), such as a microphone or an array of microphones 118. The audio capture device(s) may be integrated into the device 1501 or may be separate.

The system 100 may also include an audio output device for producing sound, such as speaker(s) 116. The audio output device may be integrated into the device 1501 or may be separate.

The device 1501 may include an address/data bus 1524 for conveying data among components of the device 1501. Each component within the device 1501 may also be directly connected to other components in addition to (or instead of) being connected to other components across the bus 1524.

The device 1501 may include one or more controllers/processors 1504, that may each include a central processing unit (CPU) for processing data and computer-readable instructions, and a memory 1506 for storing data and instructions. The memory 1506 may include volatile random access memory (RAM), non-volatile read only memory (ROM), non-volatile magnetoresistive (MRAM) and/or other types of memory. The device 1501 may also include a data storage component 1508, for storing data and controller/processor-executable instructions (e.g., instructions to perform the algorithms illustrated in FIGS. 1, 7, 8, 9 and/or 10). The data storage component 1508 may include one or more non-volatile storage types such as magnetic storage, optical storage, solid-state storage, etc. The device 1501 may also be connected to removable or external non-volatile memory and/or storage (such as a removable memory card, memory key drive, networked storage, etc.) through the input/output device interfaces 1502.

Computer instructions for operating the device 1501 and its various components may be executed by the controller(s)/processor(s) 1504, using the memory 1506 as temporary "working" storage at runtime. The computer instructions may be stored in a non-transitory manner in non-volatile memory 1506, storage 1508, or an external device. Alternatively, some or all of the executable instructions may be embedded in hardware or firmware in addition to or instead of software.

The device 1501 includes input/output device interfaces 1502. A variety of components may be connected through the input/output device interfaces 1502, such as the speaker(s) 116, the microphones 118, and a media source such as a digital media player (not illustrated). The input/output interfaces 1502 may include A/D converters 119 for converting the output of microphone 118 into signals y 120, if the microphones 118 are integrated with or hardwired directly to device 1501. If the microphones 118 are independent, the A/D converters 119 will be included with the microphones, and may be clocked independent of the clocking of the device 1501. Likewise, the input/output interfaces 1502 may include D/A converters 115 for converting the reference signals x 112 into an analog current to drive the speakers 114, if the speakers 114 are integrated with or hardwired to the device 1501. However, if the speakers are independent, the D/A converters 115 will be included with the speakers, and may be clocked independent of the clocking of the device 1501 (e.g., conventional Bluetooth speakers).

The input/output device interfaces 1502 may also include an interface for an external peripheral device connection such as universal serial bus (USB), FireWire, Thunderbolt or other connection protocol. The input/output device interfaces 1502 may also include a connection to one or more networks 1599 via an Ethernet port, a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. Through the network 1599, the system 100 may be distributed across a networked environment.

The device 1501 further includes an STFT module 1530 that includes the individual AEC 102, where there is an AEC 102 for each microphone 118.

Multiple devices 1501 may be employed in a single system 100. In such a multi-device system, each of the devices 1501 may include different components for performing different aspects of the STFT AEC process. The multiple devices may include overlapping components. The components of device 1501 as illustrated in FIG. 15 is exemplary, and may be a stand-alone device or may be included, in whole or in part, as a component of a larger device or system. For example, in certain system configurations, one device may transmit and receive the audio data, another device may perform AEC, and yet another device my use the error signals 126 for operations such as speech recognition.

The concepts disclosed herein may be applied within a number of different devices and computer systems, including, for example, general-purpose computing systems, multimedia set-top boxes, televisions, stereos, radios, server-client computing systems, telephone computing systems, laptop computers, cellular phones, personal digital assistants (PDAs), tablet computers, wearable computing devices (watches, glasses, etc.), other mobile devices, etc.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of digital signal processing and echo cancellation should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk and/or other media. Some or all of the STFT AEC module 1530 may be implemented by a digital signal processor (DSP).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for removing a frequency offset from a received audio signal, the method comprising:

transmitting a first reference signal to a first wireless speaker;

receiving a first signal from a first microphone, the first signal representing audible sound output by the first wireless speaker;

generating a second signal using the first signal, the second signal aligned to the first reference signal to remove a propagation delay between the first reference signal and the first signal;

applying a Fast Fourier Transform (FFT) to the second signal to determine a first microphone signal in a frequency domain;

applying the FFT to the first reference signal to determine a first reference signal in the frequency domain;

determining a first summation for a first frame at a first tone index of a plurality of tone indexes using the first microphone signal and a complex conjugate of the first reference signal;

determining a second summation for a second frame at the first tone index using the first microphone signal and the complex conjugate of the first reference signal, the second frame following the first frame;

determining a first angle associated with the first frame using the first summation, wherein the first angle is in radians and corresponds to a phase difference between the first reference signal and the first microphone signal;

determining a second angle associated with the second frame using the first summation and the second summation, wherein the second angle is in radians;

determining that the first angle is less than a threshold value;

determining that the second angle is less than the threshold value;

performing a first linear regression to determine a first linear fit based on the first angle and the second angle;

determining a first frequency offset between the first reference signal and the second signal based on the first linear fit, wherein the first frequency offset is a difference between a first sampling rate of the first reference signal and a second sampling rate of the second signal;

determining that the first frequency offset has a negative value; and removing at least one sample of the first reference signal per cycle based on the first frequency offset.

2. The computer-implemented method of claim 1, wherein determining the first summation further comprises:

multiplying a first complex value of the first microphone signal by a complex conjugate of a second complex value of the first reference signal to determine a first product, the first complex value and the second complex value associated with the first frequency and the first frame;

multiplying a third complex value of the first microphone signal by a complex conjugate of a fourth complex value of the first reference signal to determine a second product, the third complex value and the fourth complex value associated with the first frequency and the second frame; and generating the first summation by summing the first product and the second product.

3. The computer-implemented method of claim 1, further comprising:

multiplying the second summation by a complex conjugate of the first summation to determine a first product;

determining a third angle of the first product;

multiplying the first tone index by $2\pi$ to determine a second product; and determining the first angle by dividing the third angle by the second product.

4. The computer-implemented method of claim 1, further comprising:

determining a second frequency offset between a second reference signal and a third signal, wherein the second frequency offset is a difference between a third sampling rate of the second reference signal and a fourth sampling rate of the third signal;

determining that the second frequency offset is a positive value; and adding a duplicate copy of at least one sample of the second reference signal to the second reference signal based on the second frequency offset.

5. A computer-implemented method, comprising:

receiving a first reference signal in a frequency domain, the first reference signal being a Discrete Fourier Transform (DFT) of a second reference signal in a time domain;

receiving a first input signal in the frequency domain, the first input signal being a DFT of an audio signal in the time domain;

determining a first summation for a first frame at a first tone index using the first input signal and a complex conjugate of the first reference signal;

determining a second summation for a second frame at the first tone index using the first input signal and the complex conjugate of the first reference signal, the second frame following the first frame;

determining a first angle associated with the first frame using the first summation;

determining a second angle associated with the second frame using the first summation and the second summation;

performing a first linear regression to determine a first linear fit based on the first angle and the second angle; and determining a first frequency offset between the first reference signal and the first input signal based on the first linear fit, wherein the first frequency offset is a difference between a first sampling rate of the first reference signal and a second sampling rate of the first input signal.

6. The computer-implemented method of claim 5, further comprising:

determining that the first frequency offset has a negative value; and removing at least one sample of the first reference signal from the first reference signal per cycle.

7. The computer-implemented method of claim 5, further comprising:

determining that the first frequency offset has a positive value; and adding a duplicate copy of at least one sample of the first reference signal to the first reference signal per cycle.

8. The computer-implemented method of claim 5, further comprising:

determining, using the second summation, a third angle associated with the first frame;

determining that the third angle is above a threshold; and performing the first linear regression to determine the first linear fit based on the first angle and the second angle.

9. The computer-implemented method of claim 5, the determining the first summation further comprising:

multiplying a first complex value of the first input signal by a complex conjugate of a second complex value of the first reference signal to determine a first product, the first complex value and the second complex value associated with the first tone index and the first frame;

multiplying a third complex value of the first input signal by a complex conjugate of a fourth complex value of the first reference signal to determine a second product, the third complex value and the fourth complex value associated with the first tone index and the second frame; and generating the first summation by summing the first product and the second product.

10. The computer-implemented method of claim 5, further comprising:

multiplying the second summation by a complex conjugate of the first summation to determine a first product;

determining a third angle of the first product;

multiplying the first tone index by $2\pi$ to determine a second product; and determining the first angle by dividing the third angle by the second product.

11. The computer-implemented method of claim 5, further comprising:

transmitting the second reference signal to a first wireless speaker;

receiving the audio signal from a first microphone, the audio signal representing audible sound output by the first wireless speaker;

applying a Fast Fourier Transform (FFT) to the audio signal to determine the first input signal; and applying the FFT to the second reference signal to determine the first reference signal.

12. The computer-implemented method of claim 5, further comprising:

determining a second frequency offset between the first reference signal and the first input signal associated with a second tone index;

performing a second linear regression to determine a second linear fit based on the first frequency offset and the second frequency offset; and determining a third frequency offset between the first reference signal and the first input signal based on the second linear fit.

13. A system, comprising:

at least one processor;

a memory device including instructions operable to be executed by the at least one processor to configure the system for:

receiving a first reference signal in a frequency domain, the first reference signal being a Discrete Fourier Transform (DFT) of a second reference signal in a time domain;

receiving a first input signal in the frequency domain, the first input signal being a DFT of an audio signal in the time domain;

determining a first summation for a first frame at a first tone index using the first input signal and a complex conjugate of the first reference signal;

determining a second summation for a second frame at the first tone index using the first input signal and the complex conjugate of the first reference signal, the second frame following the first frame;

determining a first angle associated with the first frame using the first summation;

determining a second angle associated with the second frame using the first summation and the second summation;

performing a first linear regression to determine a first linear fit based on the first angle and the second angle; and determining a first frequency offset between the first reference signal and the first input signal based on the first linear fit, wherein the first frequency offset is a difference between a first sampling rate of the first reference signal and a second sampling rate of the first input signal.

14. The system of claim 13, wherein the instructions further configure the system for:

determining that the first frequency offset has a negative value; and removing at least one sample of the first reference signal from the first reference signal per cycle.

15. The system of claim 13, wherein the instructions further configure the system for:

determining that the first frequency offset has a positive value; and adding a duplicate copy of at least one sample of the first reference signal to the first reference signal per cycle.

16. The system of claim 13, wherein the instructions further configure the system for:

determining, using the second summation, a third angle associated with the first frame;

determining that the third angle is above a threshold; and performing the first linear regression to determine the first linear fit based on the first angle and the second angle.

17. The system of claim 13, wherein the instructions further configure the system for:

multiplying a first complex value of the first input signal by a complex conjugate of a second complex value of the first reference signal to determine a first product, the first complex value and the second complex value associated with the first tone index and the first frame;

multiplying a third complex value of the first input signal by a complex conjugate of a fourth complex value of the first reference signal to determine a second product, the third complex value and the fourth complex value associated with the first tone index and the second frame; and generating the first summation by summing the first product and the second product.

18. The system of claim 13, wherein the instructions further configure the system for:

multiplying the second summation by a complex conjugate of the first summation to determine a first product;

determining a third angle of the first product;

multiplying two by π by the first tone index to determine a second product; and determining the first angle by dividing the third angle by the second product.

19. The system of claim 13, wherein the instructions further configure the system for:

transmitting the second reference signal to a first wireless speaker;

receiving the audio signal from a first microphone, the audio signal representing audible sound output by the first wireless speaker;

applying a Fast Fourier Transform (FFT) to the audio signal to determine the first input signal; and applying the FFT to the second reference signal to determine the first reference signal.

20. The system of claim 13, wherein the instructions further configure the system for:

determining a second frequency offset between the first reference signal and the first input signal associated with a second tone index;

performing a second linear regression to determine a second linear fit based on the first frequency offset and the second frequency offset; and determining a third frequency offset between the first reference signal and the first input signal based on the second linear fit.

* * * * *